US010156721B2

(12) United States Patent
Scott et al.

(10) Patent No.: US 10,156,721 B2
(45) Date of Patent: Dec. 18, 2018

(54) USER-BASED CONTEXT SENSITIVE HOLOGRAM REACTION

(71) Applicant: MICROSOFT TECHNOLOGY LICENSING, LLC, Redmond, WA (US)

(72) Inventors: Jason Scott, Redmond, WA (US); Evan Michael Keibler, Bellevue, WA (US); Arthur Charles Tomlin, Kirkland, WA (US); Jonathan Paulovich, Redmond, WA (US); Ron Amador-Leon, Duvall, WA (US); Jonathan Plumb, Seattle, WA (US); Nicholas Gervase Fajt, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/642,462

(22) Filed: Mar. 9, 2015

(65) Prior Publication Data

US 2016/0266386 A1    Sep. 15, 2016

(51) Int. Cl.
*G02B 27/01* (2006.01)
*G06F 3/01* (2006.01)
*G06T 19/20* (2011.01)
*G06T 19/00* (2011.01)

(52) U.S. Cl.
CPC ....... *G02B 27/0172* (2013.01); *G02B 27/017* (2013.01); *G06F 3/012* (2013.01); *G06F 3/013* (2013.01); *G06F 3/017* (2013.01); *G06T 19/006* (2013.01); *G06T 19/20* (2013.01); *G02B 2027/014* (2013.01); *G02B 2027/0134* (2013.01); *G02B 2027/0138* (2013.01); *G02B 2027/0141* (2013.01); *G02B 2027/0178* (2013.01); *G02B 2027/0187* (2013.01)

(58) Field of Classification Search
CPC .................................................. G02B 27/0172
USPC ........................................................... 345/633
See application file for complete search history.

(56) References Cited

U.S. PATENT DOCUMENTS 6,198,484 B1 *  3/2001  Kameyama ............. G06T 15/10
                                                    345/419
7,401,920 B1 *  7/2008  Kranz .................... A61B 3/113
                                                    351/209

(Continued)

FOREIGN PATENT DOCUMENTS

WO    2014190099 A1    11/2014
WO    2014190106 A1    11/2014

OTHER PUBLICATIONS

"International Search Report and Written Opinion Issued in PCT Application No. PCT/US2016/020308", dated May 23, 2016, 14 Pages.

(Continued)

*Primary Examiner* — Javid A Amini
(74) *Attorney, Agent, or Firm* — Arent Fox LLP

(57) ABSTRACT

A system and method are disclosed for displaying virtual content. When a user is settled in a given geographic area, a full version of the content may be displayed at user-defined or processor-defined location. When the user is moving, for example leaving the geographic area, a mobile version of the content may be displayed at a body-locked position peripheral to the user's view.

16 Claims, 16 Drawing Sheets

(56) References Cited

U.S. PATENT DOCUMENTS

| | | | |
|---|---|---|---|
| 7,774,158 B2* | 8/2010 | Domingues Goncalves | G01C 21/12 701/26 |
| 7,881,901 B2* | 2/2011 | Fein | G06F 3/0304 345/156 |
| 8,218,211 B2* | 7/2012 | Kroll | G03H 1/02 359/32 |
| 8,493,206 B2* | 7/2013 | Richey | H04W 4/023 340/539.11 |
| 2003/0227542 A1* | 12/2003 | Zhang | G02B 27/017 348/61 |
| 2004/0036717 A1* | 2/2004 | Kjeldsen | H04N 5/74 715/730 |
| 2004/0046711 A1* | 3/2004 | Triebfuerst | G05B 19/409 345/8 |
| 2006/0197832 A1* | 9/2006 | Yamada | G02B 27/017 348/77 |
| 2008/0285140 A1* | 11/2008 | Amitai | G02B 6/0035 359/630 |
| 2009/0313584 A1* | 12/2009 | Kerr | G06F 3/012 715/849 |
| 2010/0199230 A1* | 8/2010 | Latta | G06F 3/017 715/863 |
| 2011/0242134 A1* | 10/2011 | Miller | G06T 19/006 345/633 |
| 2012/0068913 A1* | 3/2012 | Bar-Zeev | G02B 26/026 345/8 |
| 2012/0113092 A1* | 5/2012 | Bar-Zeev | G02B 27/017 345/419 |
| 2012/0113223 A1* | 5/2012 | Hilliges | G06F 3/00 348/46 |
| 2012/0121126 A1 | 5/2012 | Hwang et al. | |
| 2012/0142415 A1* | 6/2012 | Lindsay | H04N 5/2224 463/33 |
| 2012/0154277 A1 | 6/2012 | Bar-Zeev et al. | |
| 2012/0162065 A1* | 6/2012 | Tossell | G06K 9/00369 345/156 |
| 2012/0249741 A1* | 10/2012 | Maciocci | G06F 3/011 348/46 |
| 2012/0327491 A1* | 12/2012 | Ong | G02B 5/32 359/10 |
| 2013/0027318 A1 | 1/2013 | Lection et al. | |
| 2013/0141421 A1 | 6/2013 | Mount et al. | |
| 2013/0246967 A1* | 9/2013 | Wheeler | G06F 3/012 715/784 |
| 2013/0326364 A1* | 12/2013 | Latta | G06F 3/012 715/751 |
| 2013/0335301 A1* | 12/2013 | Wong | G02B 27/0093 345/8 |
| 2014/0049559 A1 | 2/2014 | Fleck et al. | |
| 2014/0078175 A1* | 3/2014 | Forutanpour | G02B 27/017 345/633 |
| 2014/0333666 A1* | 11/2014 | Poulos | G06T 19/006 345/633 |
| 2014/0347390 A1* | 11/2014 | Poulos | G06T 19/006 345/633 |
| 2014/0347391 A1* | 11/2014 | Keane | G06T 19/006 345/633 |
| 2014/0368533 A1* | 12/2014 | Salter | G02B 27/017 345/619 |
| 2014/0368535 A1* | 12/2014 | Salter | G02B 27/017 345/619 |
| 2015/0185825 A1* | 7/2015 | Mullins | G06T 19/006 345/633 |
| 2015/0243039 A1* | 8/2015 | Holz | G06K 9/3233 345/8 |
| 2015/0317834 A1* | 11/2015 | Poulos | G06F 3/012 345/619 |
| 2015/0365236 A1* | 12/2015 | Kim | G06F 3/017 726/18 |
| 2016/0041391 A1* | 2/2016 | Van Curen | G02B 27/0172 345/633 |
| 2016/0048204 A1* | 2/2016 | Scott | G06F 3/04845 345/156 |

OTHER PUBLICATIONS

"Second Written Opinion Issued in PCT Application No. PCT/US2016/020308", dated Feb. 1, 2017, 7 Pages.

"International Preliminary Report on Patentability Issued in PCT Application No. PCT/US2016/020308", dated Jun. 7, 2017, 8 Pages.

* cited by examiner (Step 626)

*(Step 734)*

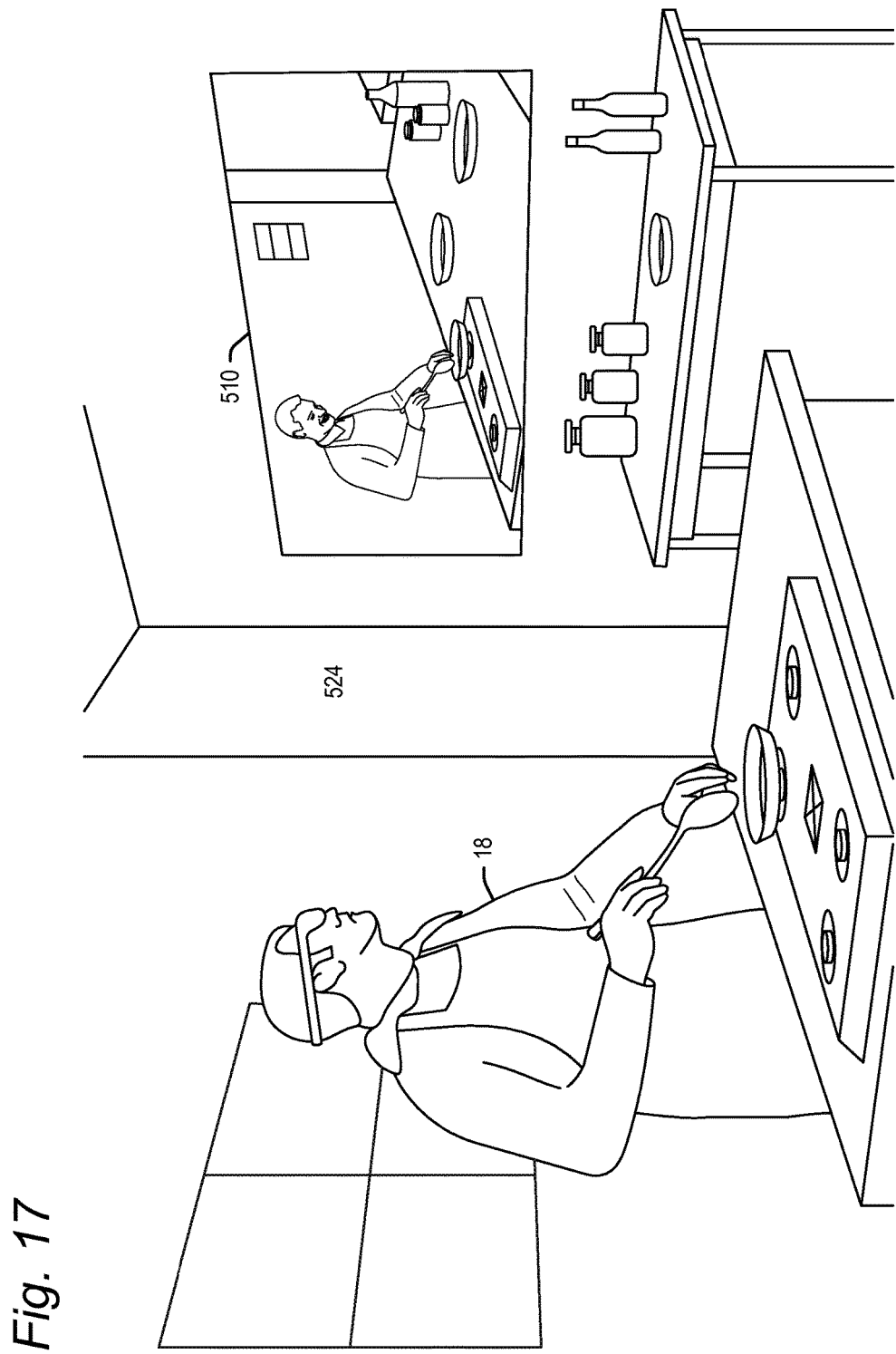

USER-BASED CONTEXT SENSITIVE HOLOGRAM REACTION

BACKGROUND

Mixed reality is a technology that allows virtual imagery to be mixed with a real-world physical environment. A see-through, head mounted, mixed reality display device may be worn by a user to view the mixed imagery of real objects and virtual objects displayed in the user's field of view. It would be advantageous to allow mobile mixed reality experiences, where a user wearing a head mounted display device is able to move around, for example from room to room, while engaged in a mixed reality experience. It would further be advantageous to provide a mobile mixed reality experience which intelligently reacts to user's actions and movements.

SUMMARY

Embodiments of the present technology relate to a system and method for providing an intelligent mobile mixed reality experience which reacts to user movements, inferred intentions and interactions. A system for creating virtual objects for the mixed reality experience in general includes a see-through, head mounted display device coupled to at least one processing unit. The processing unit in cooperation with the head mounted display device(s) are able to detect and identify a geographic area in which the user is receiving virtual content. The content may be displayed to the user within the geographic area per user-defined rules and preferences relating to that geographic area. In the absence of user-defined rules, the processing unit is able optimize the experience by determining how and where to best display the virtual content.

The processing unit and head mounted display device are further able to determine when a user is moving from or within the geographic area. In examples, the processing unit may then switch the displayed content to a mobile version of the content, where it is positioned in a user's peripheral view so as not to inhibit the user's ability to move around.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 12-17 illustrate examples of stationary and mobile virtual environments according to aspects of the present technology.

DETAILED DESCRIPTION

Figure 1:
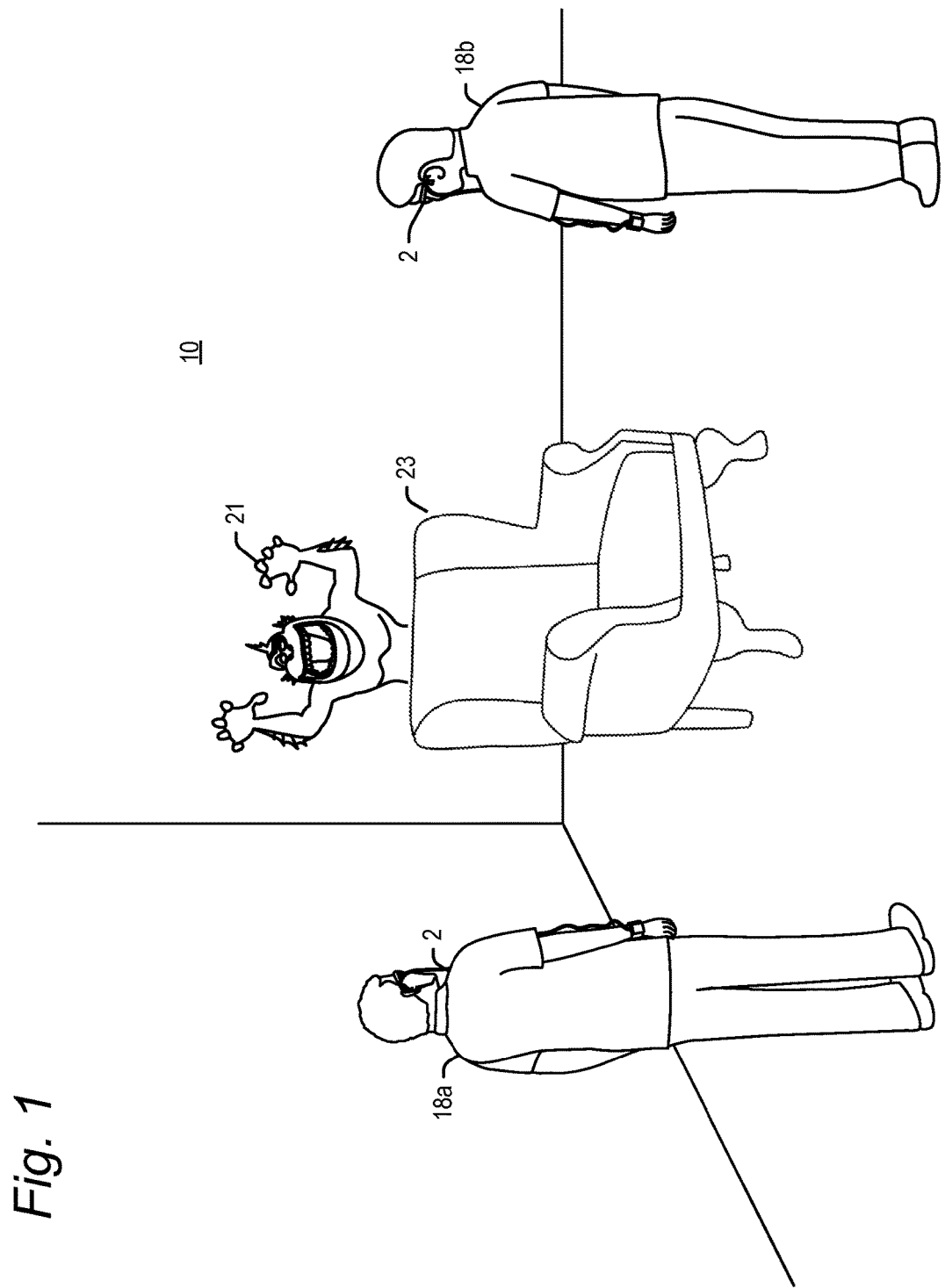
FIG. 1 is an illustration of a virtual reality environment including real and virtual objects.

Embodiments of the present technology will now be described with reference to the figures, which in general relate to a system and method for providing an intelligent mobile mixed reality experience which reacts to user movements, inferred intentions and interactions. When a user is settled in a given geographic area, a full version of the content may be displayed at user-defined or processor-defined location. When the user is moving, for example leaving the geographic area, a mobile version of the content may be displayed at a body-locked position peripheral to the user's view.

In embodiments, the system and method may use a mobile mixed reality assembly to generate a three-dimensional mixed reality environment. The mixed reality assembly includes a mobile processing unit coupled to a head mounted display device (or other suitable apparatus) having a camera and a display element. The display element is to a degree transparent so that a user can look through the display element at real world objects within the user's field of view (FOV). The display element also provides the ability to project virtual images into the FOV of the user such that the virtual images may also appear alongside the real world objects. The system automatically tracks where the user is looking so that the system can determine where to insert a virtual image in the FOV of the user. Once the system knows where to project the virtual image, the image is projected using the display element.

In embodiments, the processing unit may build a model of the environment including the x, y, z Cartesian positions of users, real world objects and virtual three-dimensional objects in a given geographic area, such as a room or other environment. The positions of each head mounted display device may be calibrated to the model of the environment. This allows the system to determine each user's line of sight and FOV of the environment. Thus, a virtual image may be displayed to each user, but the system determines the display of the virtual image from each user's perspective, adjusting the virtual image for parallax and any occlusions of or by other objects in the environment. The three-dimensional model of the environment, referred to herein as a scene map, as well as all tracking of each user's FOV and objects in the environment may be generated by the mobile processing unit by itself, or working in tandem with other processing devices as explained hereinafter.

A virtual environment provided by the present system may be coextensive with a real world space. In other words, the virtual environment may be laid over and share the same area as a real world space. A user moving around a real world space may also move around in the coextensive virtual environment, and view virtual and/or real objects from different perspectives and vantage points. One type of virtual environment is a mixed reality environment, where the virtual environment includes both virtual objects and real-world objects. Another type of virtual environment includes only virtual objects.

The virtual environment may fit within the confines of a room or other real-world space. Alternatively, the virtual environment may be larger than the confines of the real-world physical space. Virtual environments may be completely created by one or more users. Alternatively, portions of the virtual environment may be downloaded, for example from a software application running on the processing unit.

Embodiments are described below which intelligently position and/or select one or more virtual objects, such as virtual content, within one or more geographic areas for display to the user. A geographic area as used herein refers to the area in which a head mounted display device is used and is generally defined by a scene map as described below. Geographic areas may in general be rooms in a home, office or other building, bounded by one or more walls. Geographic areas may be other areas in which a head mounted display device is used, including for example cubicles.

Geographic areas may be known to a user, such as for example being one or more rooms in a user's house. In this instance, a user may create one or more rules to define how virtual content is to be displayed within these one or more known geographic areas as explained below. In further embodiments, the geographic areas may not be known to the user, or may be known to the user but the user has not defined any rules for that area. In this instance, the present technology may apply various heuristics to determine where and how best to display content as explained below.

In embodiments, the present technology may be employed for a user to view virtual objects, which in embodiments may be virtual content. This content may for example be displayed on a virtual display slate floating in three-dimensional space, such as display slate 508 displaying content 510 in FIG. 13, described below. The opacity filter 114 is used to mask real world objects and light behind (from the user's view point) the virtual display slate 508, so that the virtual display slate 508 appears as a virtual screen for viewing virtual content 510. The virtual display slate may have a depth, so that the user can view content when positioned in front of the virtual display slate, but see the back of the virtual display slate (and not content) when positioned behind the virtual display slate. In further embodiments, the present technology may omit the display slate, and simply pin displayed content to a wall within a geographic area in which the person is positioned as explained below.

Whether displayed on a virtual display slate or on a wall, virtual content may be any of a wide variety of content types, including static images and dynamic video. The video may for example be live or recorded video feeds of movies, television programs, sporting events, current events and a wide variety of other media content. The displayed content may further be web pages and user interfaces for applications such as a search engine, email application, word processor and a wide variety of other applications. The displayed content may be downloaded over a network connection as explained below and displayed to the user on a virtual display slate or on a wall.

It is understood that the present technology may be used to display a variety of other virtual objects. As used herein, virtual content and virtual display slates are examples of virtual objects, also referred to at times herein as holograms. Moreover, in the following description, virtual content is described as being displayed at a certain position in three-dimensional space, such as for example on a wall. It is understood that this refers to stereoscopically displaying the virtual content to lenses in the head mounted display device 2, so that the user perceives the virtual content as being displayed at the position in three-dimensional space, such as the wall.

As described below, a user may interact with displayed holograms in a wide variety of ways, for example to move and resize a displayed hologram. Where the hologram is dynamic content such as a video, a user may interact with the hologram to advance through, rewind and pause the hologram.

As used herein, a user may interact with holograms using physical and/or verbal gestures. Physical gestures include a user performing a predefined gesture using his or her fingers, hands and/or other body parts recognized by the mixed reality system as a user command for the system to perform a predefined action. Such predefined gestures may include, but are not limited to, pointing at, grabbing, pushing, resizing and shaping virtual objects. Physical interaction may further include contact by the user with a virtual object. For example, a user may position his or her hands in three-dimensional space at a location corresponding to the position of a virtual object. The user may thereafter perform a gesture, such as grabbing or pushing, which is interpreted by the mixed reality system, and the corresponding action is performed on the virtual object, e.g., the object may be grabbed and may thereafter be stretched or resized. As a further example, a user can interact with a virtual button by pushing it.

A user may also physically interact with a virtual object with his or her head or eyes. In some instances, head position or eye gaze data identifies where a user is focusing in the FOV, and can thus identify that a user is looking at a particular virtual object. Sustained head position, eye gaze, or a blink or blink sequence may thus be a physical interaction whereby a user selects or otherwise interacts with one or more virtual objects.

A user may alternatively or additionally interact with virtual objects using verbal gestures, such as for example a spoken word or phrase recognized by the mixed reality system as a user command for the system to perform a predefined action. Verbal gestures may be used in conjunction with physical gestures to interact with one or more virtual objects in the virtual environment.

Figure 2:
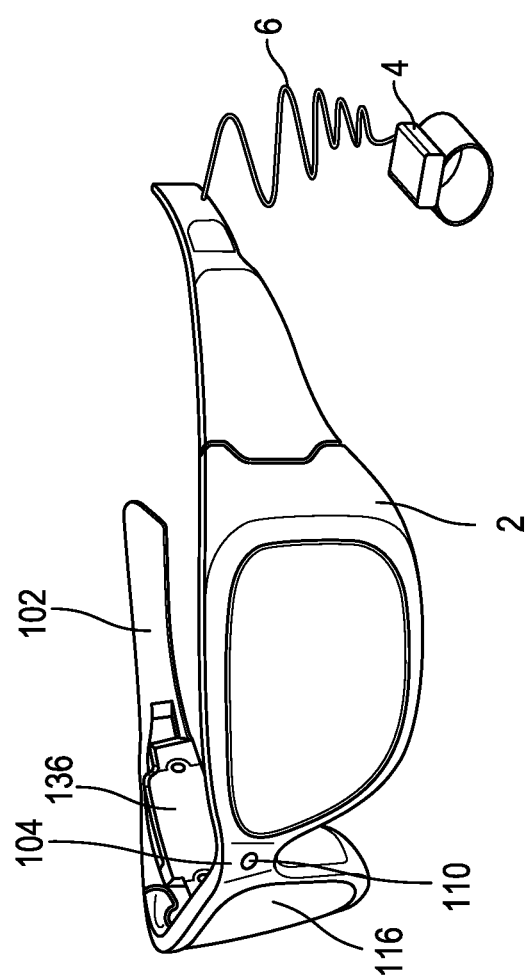
FIG. 2 is a perspective view of one embodiment of a head mounted display unit.

FIG. 1 illustrates a mixed reality environment 10 for providing a mixed reality experience to users by fusing virtual content 21 (completed virtual content in this example) with real content 23 within each user's FOV. FIG. 1 shows two users 18*a* and 18*b*, each wearing a head mounted display device 2, and each viewing the virtual content 21 adjusted to their perspective. It is understood that the particular virtual content shown in FIG. 1 is by way of example only, and may be any of a wide variety of virtual objects, including virtual tools and virtual workpieces as explained below. As shown in FIG. 2, each head mounted display device 2 may include or be in communication with its own processing unit 4, for example via a flexible wire 6. The head mounted display device may alternatively communicate wirelessly with the processing unit 4. In further embodiments, the processing unit 4 may be integrated into the head mounted display device 2. Head mounted display device 2, which in one embodiment is in the shape of glasses, is worn on the head of a user so that the user can see through a display and thereby have an actual direct view of the space in front of the user. More details of the head mounted display device 2 and processing unit 4 are provided below.

Where not incorporated into the head mounted display device 2, the processing unit 4 may be a small, portable device for example worn on the user's wrist or stored within a user's pocket. The processing unit 4 may include hardware components and/or software components to execute applications such as gaming applications, non-gaming applications, or the like. In one embodiment, processing unit 4 may include a processor such as a standardized processor, a specialized processor, a microprocessor, or the like that may execute instructions stored on a processor readable storage device for performing the processes described herein. In embodiments, the processing unit 4 may communicate wirelessly (e.g., WiFi, Bluetooth, infra-red, or other wireless communication means) to one or more remote computing systems. These remote computing systems may including a computer, a gaming system or console, or a remote service provider.

The head mounted display device 2 and processing unit 4 may cooperate with each other to present virtual objects 21 to a user in a mixed reality environment 10. The details of the present system for building virtual objects are explained below. The details of the mobile head mounted display device 2 and processing unit 4 which enable the building of virtual objects will now be explained with reference to FIGS. 2-6.

Figure 3:
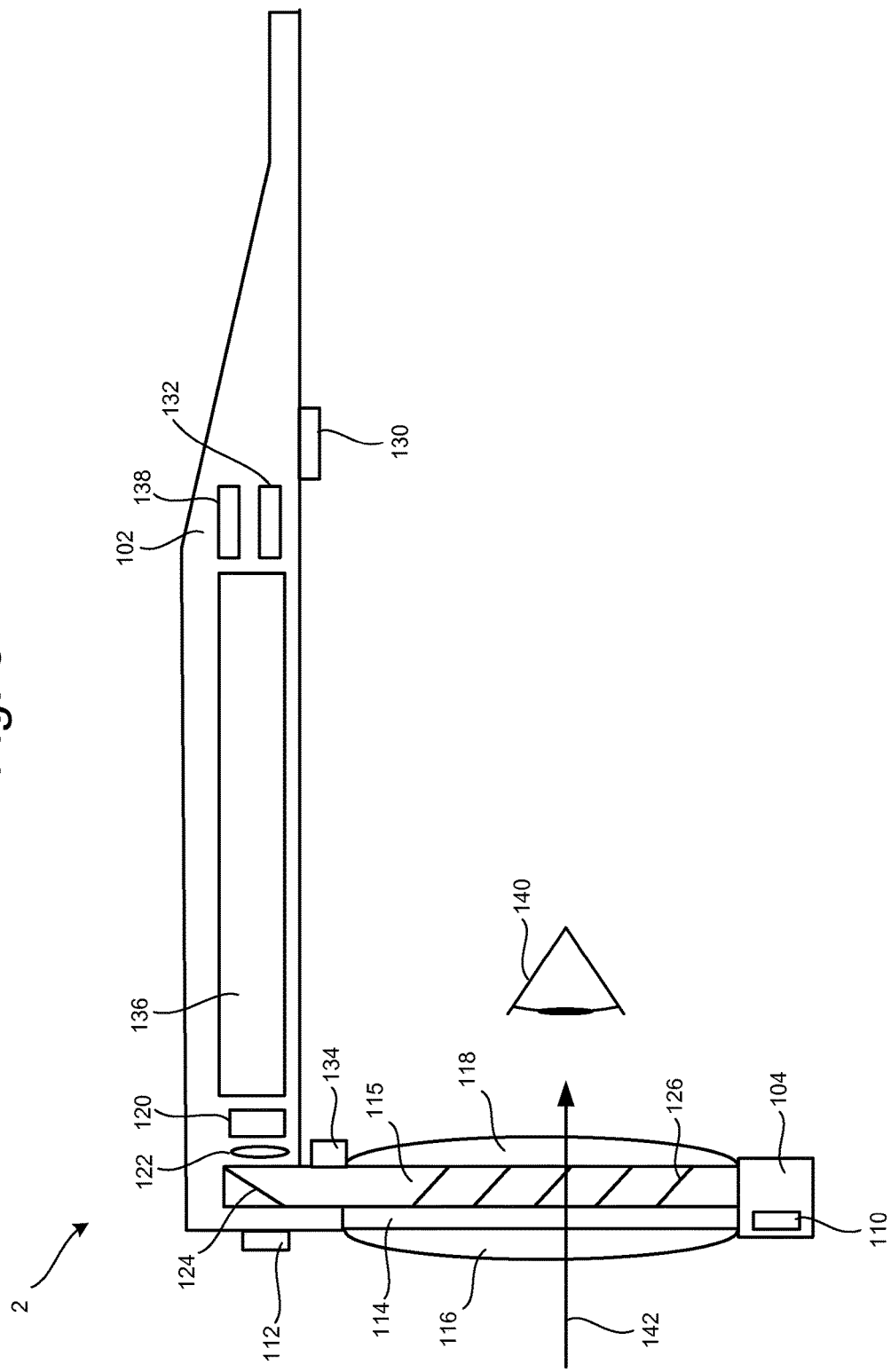
FIG. 3 is a side view of a portion of one embodiment of a head mounted display unit.

FIGS. 2 and 3 show perspective and side views of the head mounted display device 2. FIG. 3 shows only the right side of head mounted display device 2, including a portion of the device having temple 102 and nose bridge 104. Built into nose bridge 104 is a microphone 110 for recording sounds and transmitting that audio data to processing unit 4, as described below. At the front of head mounted display device 2 is room-facing video camera 112 that can capture video and still images. Those images are transmitted to processing unit 4, as described below.

A portion of the frame of head mounted display device 2 will surround a display (that includes one or more lenses). In order to show the components of head mounted display device 2, a portion of the frame surrounding the display is not depicted. The display includes a light-guide optical element 115, opacity filter 114, see-through lens 116 and see-through lens 118. In one embodiment, opacity filter 114 is behind and aligned with see-through lens 116, light-guide optical element 115 is behind and aligned with opacity filter 114, and see-through lens 118 is behind and aligned with light-guide optical element 115. See-through lenses 116 and 118 are standard lenses used in eye glasses and can be made to any prescription (including no prescription). In one embodiment, see-through lenses 116 and 118 can be replaced by a variable prescription lens. Opacity filter 114 filters out natural light (either on a per pixel basis or uniformly) to enhance the contrast of the virtual imagery. Light-guide optical element 115 channels artificial light to the eye. More details of opacity filter 114 and light-guide optical element 115 are provided below.

Mounted to or inside temple 102 is an image source, which (in one embodiment) includes microdisplay 120 for projecting a virtual image and lens 122 for directing images from microdisplay 120 into light-guide optical element 115. In one embodiment, lens 122 is a collimating lens.

Control circuits 136 provide various electronics that support the other components of head mounted display device 2. More details of control circuits 136 are provided below with respect to FIG. 4. Inside or mounted to temple 102 are ear phones 130, inertial measurement unit 132 and temperature sensor 138. In one embodiment shown in FIG. 4, the inertial measurement unit 132 (or IMU 132) includes inertial sensors such as a three axis magnetometer 132A, three axis gyro 132B and three axis accelerometer 132C. The inertial measurement unit 132 senses position, orientation, and sudden accelerations (pitch, roll and yaw) of head mounted display device 2. The IMU 132 may include other inertial sensors in addition to or instead of magnetometer 132A, gyro 132B and accelerometer 132C.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are examples of reflective technologies which are efficient as most energy is reflected away from the modulated structure and may be used in the present system. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light-guide optical element 115 transmits light from microdisplay 120 to the eye 140 of the user wearing head mounted display device 2. Light-guide optical element 115 also allows light from in front of the head mounted display device 2 to be transmitted through light-guide optical element 115 to eye 140, as depicted by arrow 142, thereby allowing the user to have an actual direct view of the space in front of head mounted display device 2 in addition to receiving a virtual image from microdisplay 120. Thus, the walls of light-guide optical element 115 are see-through. Light-guide optical element 115 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar substrate comprising light-guide optical element 115 by internal reflection. After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user.

As different light rays will travel and bounce off the inside of the substrate at different angles, the different rays will hit the various reflecting surfaces 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a light-guide optical element can be found in United States Patent Publication No. 2008/0285140, entitled "Substrate-Guided Optical Devices," published on Nov. 20, 2008. In one embodiment, each eye will have its own light-guide optical element 115. When the head mounted display device 2 has two light-guide optical elements, each eye can have its own microdisplay 120 that can display the same image in both eyes or different images in the two eyes. In another embodiment, there can be one light-guide optical element which reflects light into both eyes.

Opacity filter 114, which is aligned with light-guide optical element 115, selectively blocks natural light, either uniformly or on a per-pixel basis, from passing through light-guide optical element 115. Details of an example of opacity filter 114 are provided in U.S. Patent Publication No. 2012/0068913 to Bar-Zeev et al., entitled "Opacity Filter For See-Through Mounted Display," filed on Sep. 21, 2010. However, in general, an embodiment of the opacity filter 114 can be a see-through LCD panel, an electrochromic film, or similar device which is capable of serving as an opacity filter. Opacity filter 114 can include a dense grid of pixels, where the light transmissivity of each pixel is individually controllable with a mask of alpha values between minimum and maximum transmissivities. While a transmissivity range of 0-100% is ideal, more limited ranges are also acceptable, such as for example about 50% to 90% per pixel.

A mask of alpha values can be used from a rendering pipeline, after z-buffering with proxies for real-world objects. When the system renders a scene for the mixed reality display, it takes note of which real-world objects are in front of which virtual objects as explained below. If a virtual object is in front of a real-world object, then the opacity may be on for the coverage area of the virtual object. If the virtual object is (virtually) behind a real-world object, then the opacity may be off, as well as any color for that pixel, so the user will see just the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs.

Figure 4:
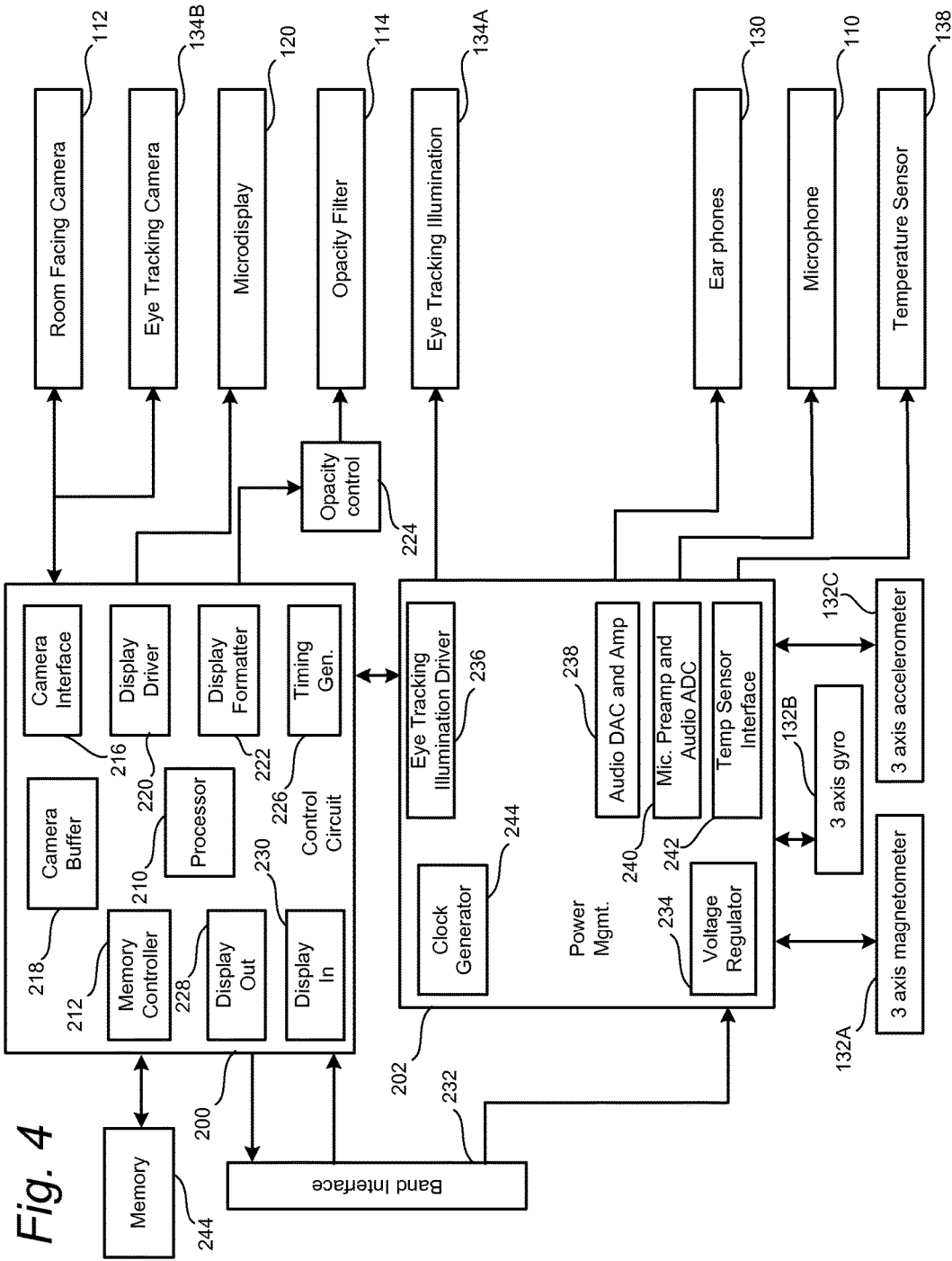
FIG. 4 is a block diagram of one embodiment of the components of a head mounted display unit.

Head mounted display device 2 also includes a system for tracking the position of the user's eyes. As will be explained below, the system will track the user's position and orientation so that the system can determine the FOV of the user. However, a human will not perceive everything in front of them. Instead, a user's eyes will be directed at a subset of the environment. Therefore, in one embodiment, the system will include technology for tracking the position of the user's eyes in order to refine the measurement of the FOV of the user. For example, head mounted display device 2 includes eye tracking assembly 134 (FIG. 3), which has an eye tracking illumination device 134A and eye tracking camera 134B (FIG. 4). In one embodiment, eye tracking illumination device 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. For example, see U.S. Pat. No. 7,401,920, entitled "Head Mounted Eye Tracking and Display System", issued Jul. 22, 2008. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eyes usually move in unison. However, it is possible to track each eye separately.

In one embodiment, the system will use four IR LEDs and four IR photo detectors in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but just one infrared CCD on the side of the lens of head mounted display device 2. The CCD may use a small mirror and/or lens (fish eye) such that the CCD can image up to 75% of the visible eye from the glasses frame. The CCD will then sense an image and use computer vision to find the image, much like as discussed above. Thus, although FIG. 3 shows one assembly with one IR transmitter, the structure of FIG. 3 can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used.

FIG. 3 only shows half of the head mounted display device 2. A full head mounted display device may include another set of see-through lenses, another opacity filter, another light-guide optical element, another microdisplay 120, another lens 122, room-facing camera, eye tracking assembly 134, earphones, and temperature sensor.

Figure 5:
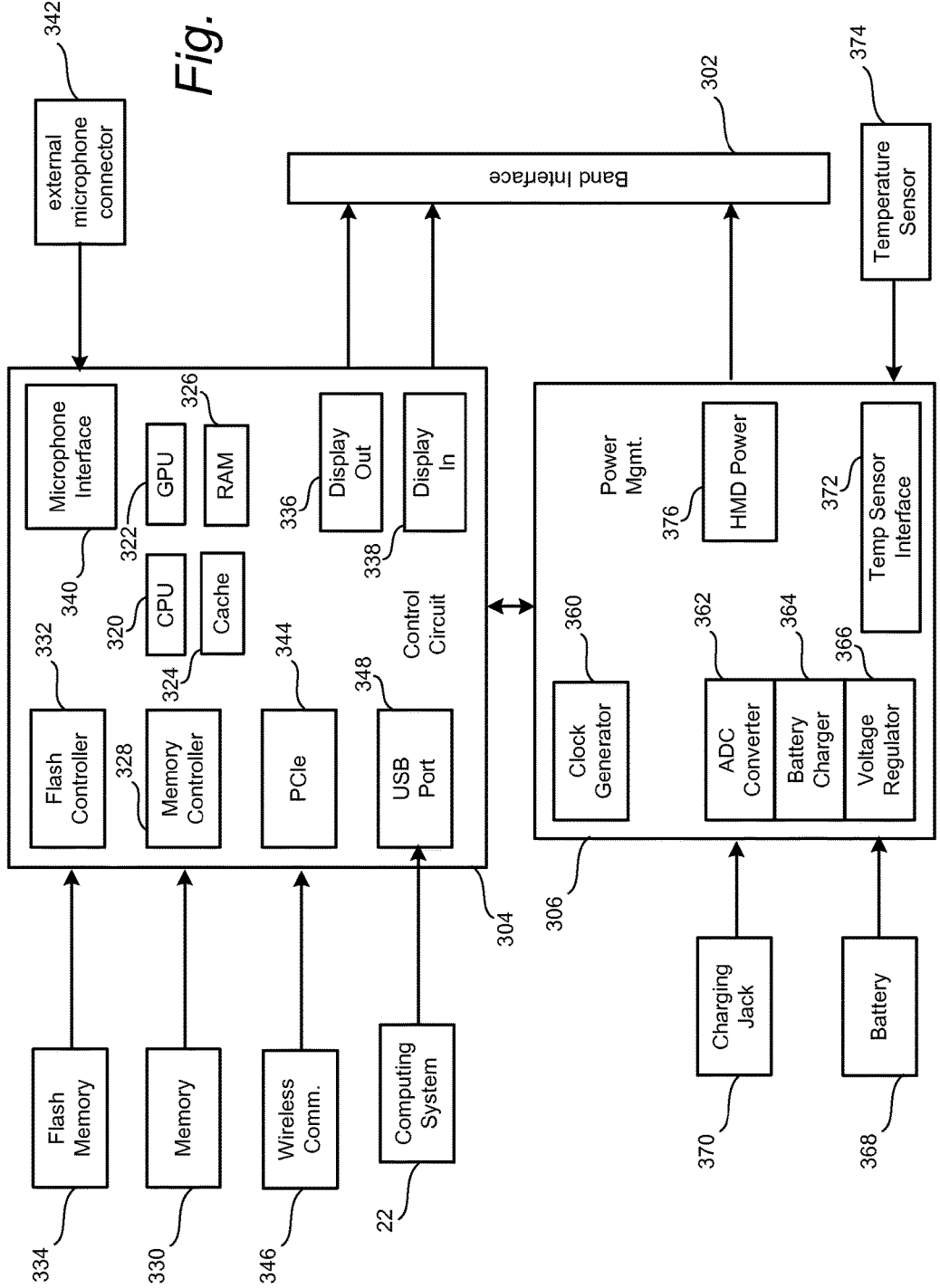
FIG. 5 is a block diagram of one embodiment of the components of a processing unit associated with a head mounted display unit.

FIG. 4 is a block diagram depicting the various components of head mounted display device 2. FIG. 5 is a block diagram describing the various components of processing unit 4. Head mounted display device 2, the components of which are depicted in FIG. 4, is used to provide a virtual experience to the user by fusing one or more virtual images seamlessly with the user's view of the real world. Additionally, the head mounted display device components of FIG. 4 include many sensors that track various conditions. Head mounted display device 2 will receive instructions about the virtual image from processing unit 4 and will provide the sensor information back to processing unit 4. Processing unit 4 may determine where and when to provide a virtual image to the user and send instructions accordingly to the head mounted display device of FIG. 4.

Some of the components of FIG. 4 (e.g., room-facing camera 112, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of head mounted display device 2. FIG. 4 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230.

In one embodiment, the components of control circuit 200 are in communication with each other via dedicated lines or one or more buses. In another embodiment, the components of control circuit 200 is in communication with processor 210. Camera interface 216 provides an interface to the two room-facing cameras 112 and stores images received from the room-facing cameras in camera buffer 218. Display driver 220 will drive microdisplay 120. Display formatter 222 provides information, about the virtual image being displayed on microdisplay 120, to opacity control circuit 224, which controls opacity filter 114. Timing generator 226 is used to provide timing data for the system. Display out interface 228 is a buffer for providing images from room-facing cameras 112 to the processing unit 4. Display in interface 230 is a buffer for receiving images such as a virtual image to be displayed on microdisplay 120. Display out interface 228 and display in interface 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 output audio information to the earphones 130. Microphone preamplifier and audio ADC 240 provides an interface for microphone 110. Temperature sensor interface 242 is an interface for temperature sensor 138. Power management circuit 202 also provides power and receives data back from three axis magnetometer 132A, three axis gyro 132B and three axis accelerometer 132C.

FIG. 5 is a block diagram describing the various components of processing unit 4. FIG. 5 shows control circuit 304 in communication with power management circuit 306. Control circuit 304 includes a central processing unit (CPU) 320, graphics processing unit (GPU) 322, cache 324, RAM 326, memory controller 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, BlueTooth communication device, infrared communication device, etc. The USB port can be used to dock the processing unit 4 to processing unit computing system 22 in order to load data or software onto processing unit 4, as well as charge processing unit 4. In one embodiment, CPU 320 and GPU 322 are the main workhorses for determining where, when and how to insert virtual three-dimensional objects into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (possibly located on the wrist band of processing unit 4). Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

Figure 6:
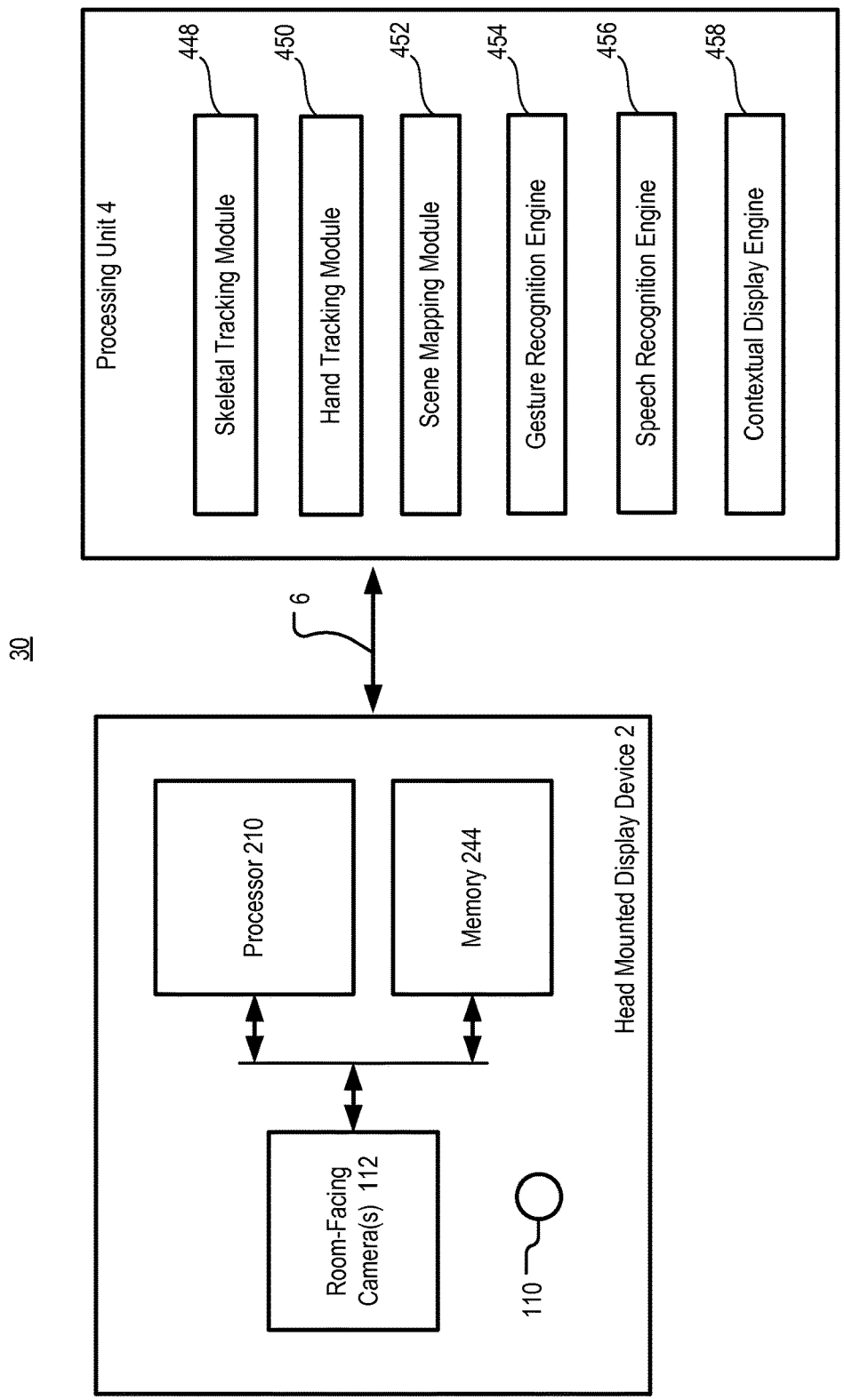
FIG. 6 is a block diagram of one embodiment of the software components of a processing unit associated with the head mounted display unit.

FIG. 6 illustrates a high-level block diagram of the mobile mixed reality assembly 30 including the room-facing camera 112 of the display device 2 and some of the software modules on the processing unit 4. Some or all of these software modules may alternatively be implemented on a processor 210 of the head mounted display device 2. As shown, the room-facing camera 112 provides image data to the processor 210 in the head mounted display device 2. In one embodiment, the room-facing camera 112 may include a depth camera, an RGB camera and an IR light component to capture image data of a scene. As explained below, the room-facing camera 112 may include less than all of these components.

Using for example time-of-flight analysis, the IR light component may emit an infrared light onto the scene and may then use sensors (not shown) to detect the backscattered light from the surface of one or more objects in the scene using, for example, the depth camera and/or the RGB camera. In some embodiments, pulsed infrared light may be used such that the time between an outgoing light pulse and a corresponding incoming light pulse may be measured and used to determine a physical distance from the room-facing camera 112 to a particular location on the objects in the scene, including for example a user's hands. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the room-facing camera 112 to a particular location on the objects by analyzing the intensity of the reflected beam of light over time via various techniques including, for example, shuttered light pulse imaging.

In another example embodiment, the room-facing camera 112 may use a structured light to capture depth information. In such an analysis, patterned light (i.e., light displayed as a known pattern such as a grid pattern, a stripe pattern, or different pattern) may be projected onto the scene via, for example, the IR light component. Upon striking the surface of one or more targets or objects in the scene, the pattern may become deformed in response. Such a deformation of the pattern may be captured by, for example, the 3-D camera and/or the RGB camera (and/or other sensor) and may then be analyzed to determine a physical distance from the room-facing camera 112 to a particular location on the objects. In some implementations, the IR light component is displaced from the depth and/or RGB cameras so triangulation can be used to determined distance from depth and/or RGB cameras. In some implementations, the room-facing camera 112 may include a dedicated IR sensor to sense the IR light, or a sensor with an IR filter.

It is understood that the present technology may sense objects and three-dimensional positions of the objects without each of a depth camera, RGB camera and IR light component. In embodiments, the room-facing camera 112 may for example work with just a standard image camera (RGB or black and white). Such embodiments may operate by a variety of image tracking techniques used individually or in combination. For example, a single, standard image room-facing camera 112 may use feature identification and tracking. That is, using the image data from the standard camera, it is possible to extract interesting regions, or features, of the scene. By looking for those same features over a period of time, information for the objects may be determined in three-dimensional space.

In embodiments, the head mounted display device 2 may include two spaced apart standard image room-facing cameras 112. In this instance, depth to objects in the scene may be determined by the stereo effect of the two cameras. Each camera can image some overlapping set of features, and depth can be computed from the parallax difference in their views.

A further method for determining a scene map with positional information within an unknown environment is known as simultaneous localization and mapping (SLAM). One example of SLAM is disclosed in U.S. Pat. No. 7,774,158, entitled "Systems and Methods for Landmark Generation for Visual Simultaneous Localization and Mapping." Additionally, data from the IMU can be used to interpret visual tracking data more accurately.

The processing unit 4 may include a scene mapping module 452. Using the data from the front-facing camera(s) 112 as described above, the scene mapping module is able to map objects in the scene (including one or both of the user's hands) to a three-dimensional frame of reference. Further details of the scene mapping module are described below.

In order to track the position of users within a scene, users may be recognized from image data. The processing unit 4 may implement a skeletal recognition and tracking module 448. An example of a skeletal tracking module 448 is disclosed in U.S. Patent Publication No. 2012/0162065, entitled, "Skeletal Joint Recognition And Tracking System." Such systems may also track a user's hands. However, in embodiments, the processing unit 4 may further execute a hand recognition and tracking module 450. The module 450 receives the image data from the room-facing camera 112 and is able to identify a user's hand, and a position of the user's hand, in the FOV. An example of the hand recognition and tracking module 450 is disclosed in U.S. Patent Publication No. 2012/0308140, entitled, "System for Recognizing an Open or Closed Hand." In general the module 450 may examine the image data to discern width and length of objects which may be fingers, spaces between fingers and valleys where fingers come together so as to identify and track a user's hands in their various positions.

The processing unit 4 may further include a gesture recognition engine 454 for receiving skeletal model and/or hand data for one or more users in the scene and determining whether the user is performing a predefined gesture or application-control movement affecting an application running on the processing unit 4. More information about gesture recognition engine 454 can be found in U.S. patent application Ser. No. 12/422,661, entitled "Gesture Recognizer System Architecture," filed on Apr. 13, 2009.

As mentioned above, a user may perform various verbal gestures, for example in the form of spoken commands to select objects and possibly modify those objects. Accordingly, the present system further includes a speech recognition engine 456. The speech recognition engine 456 may operate according to any of various known technologies.

In one example embodiment, the head mounted display device 2 and processing unit 4 work together to create the scene map or model of the environment that the user is in and tracks various moving or stationary objects in that environment. In addition, the processing unit 4 tracks the FOV of the head mounted display device 2 worn by the user 18 by tracking the position and orientation of the head mounted display device 2. Sensor information, for example from the room-facing cameras 112 and IMU 132, obtained by head mounted display device 2 is transmitted to processing unit 4. The processing unit 4 processes the data and updates the scene model. In accordance with the present technology, the processing unit 4 further implements a contextual display software engine 458 for intelligent positioning of virtual objects displayed to a user. Using in part instructions from the contextual display software engine 458, the processing unit 4 provides instructions to head mounted display device 2 on where, when and how to insert virtual objects. Each of the above-described operations will now be described in greater detail with reference to the flowchart of FIG. 7.

Figure 7:
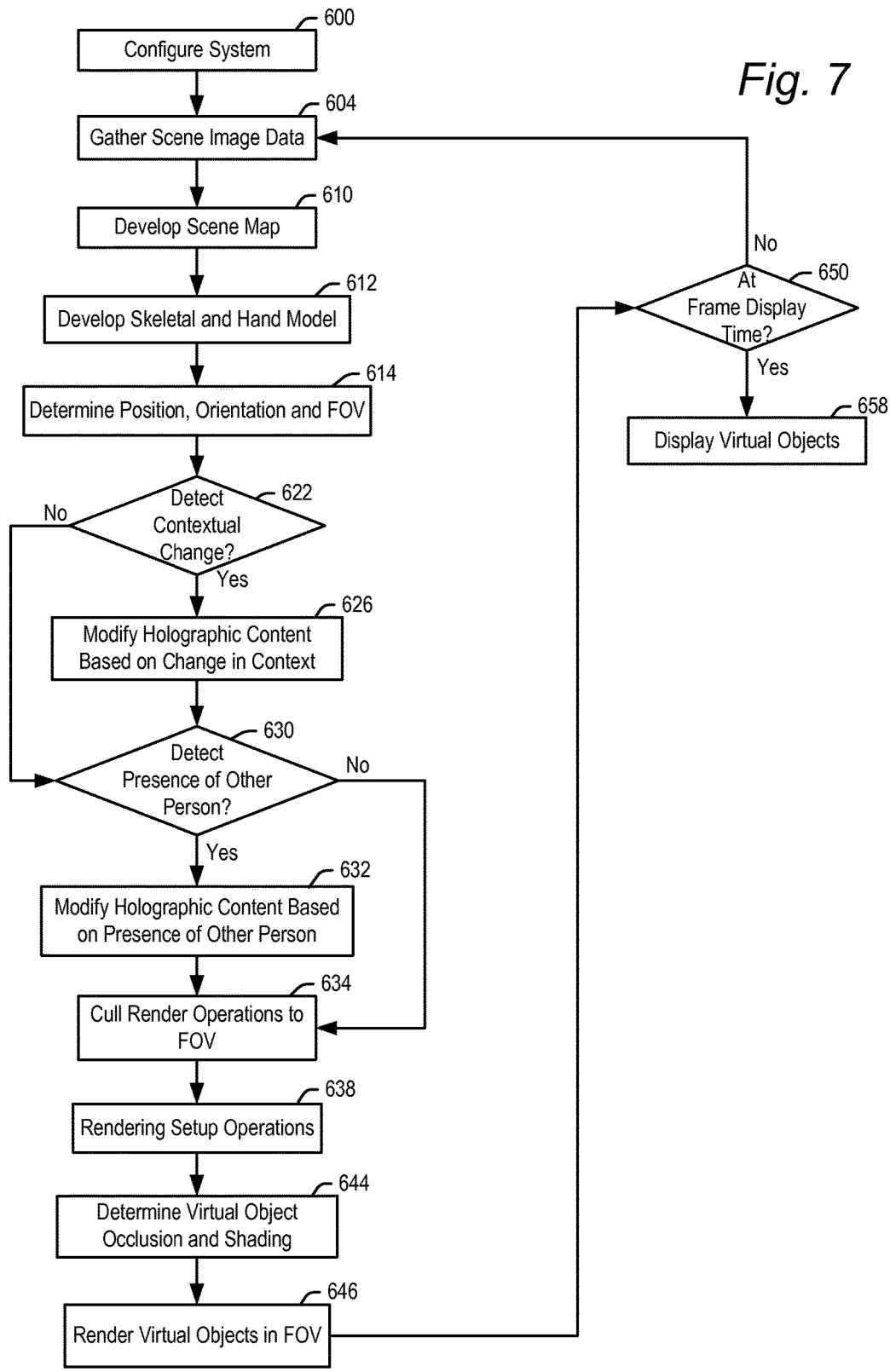
FIG. 7 is a flowchart showing the operation of one or more processing units associated with a head mounted display unit of the present system.

FIG. 7 is a high level flowchart of the operation and interactivity of the processing unit 4 and head mounted display device 2 during a discrete time period such as the time it takes to generate, render and display a single frame of image data to each user. In embodiments, data may be refreshed at a rate of 60 Hz, though it may be refreshed more often or less often in further embodiments.

In general, the system may generate a scene map having x, y, z coordinates of the environment and objects in the environment such as virtual objects and real world objects. For a given frame of image data, a user's view may include one or more real and/or virtual objects. As a user turns his or her head, for example left to right or up and down, positions of stationary real world and certain virtual objects do not change in three-dimensional space, but their positions do change in the user's FOV. Such objects may be referred to herein as world locked.

Some virtual objects may remain in the same position in a user's FOV, even where a user moves his or her head. Such virtual objects may be referred to herein as being head locked. A third class of virtual objects remain in the same position relative to a person's body. Thus, these virtual objects may move with a user, for example when a user walks or turns around, but the user can move his or her head to look at, or look away from, these virtual objects. Such virtual objects may be referred to herein as being body locked.

The system for presenting a virtual environment to one or more users 18 may be configured in step 600. For example, as explained below, a user 18 or operator of the system may specify a video or other virtual content that is to be presented, and where it is to be presented. In steps 604 the processing unit 4 gathers data from the scene. This may be image data sensed by the head mounted display device 2, and in particular, by the room-facing cameras 112, the eye tracking assemblies 134 and the IMU 132.

A scene map may be developed in step 610 identifying the geometry of the scene as well as the geometry and positions of objects within the scene. In embodiments, the scene map generated in a given frame may include the x, y and z positions of a user's hand(s), other real world objects and virtual objects in the scene. Methods for gathering depth and position data have been explained above.

The processing unit 4 may next translate the image data points captured by the sensors into an orthogonal 3-D scene map. This orthogonal 3-D scene map may be a point cloud map of all image data captured by the head mounted display device cameras in an orthogonal x, y, z Cartesian coordinate system. Methods using matrix transformation equations for translating camera view to an orthogonal 3-D world view are known. See, for example, David H. Eberly, "3d Game Engine Design: A Practical Approach To Real-Time Computer Graphics," Morgan Kaufman Publishers (2000).

Figure 8:
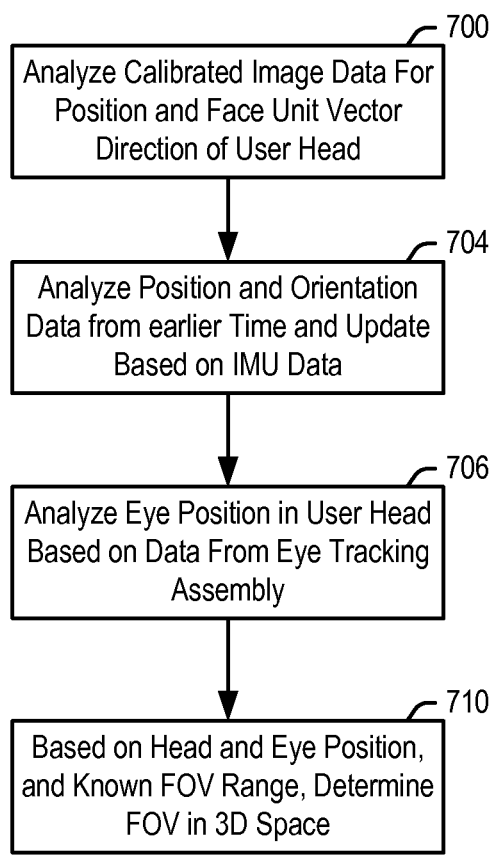
FIGS. 8-11 are more detailed flowcharts of examples of various steps shown in the flowchart of FIG. 7.
Figure 9:
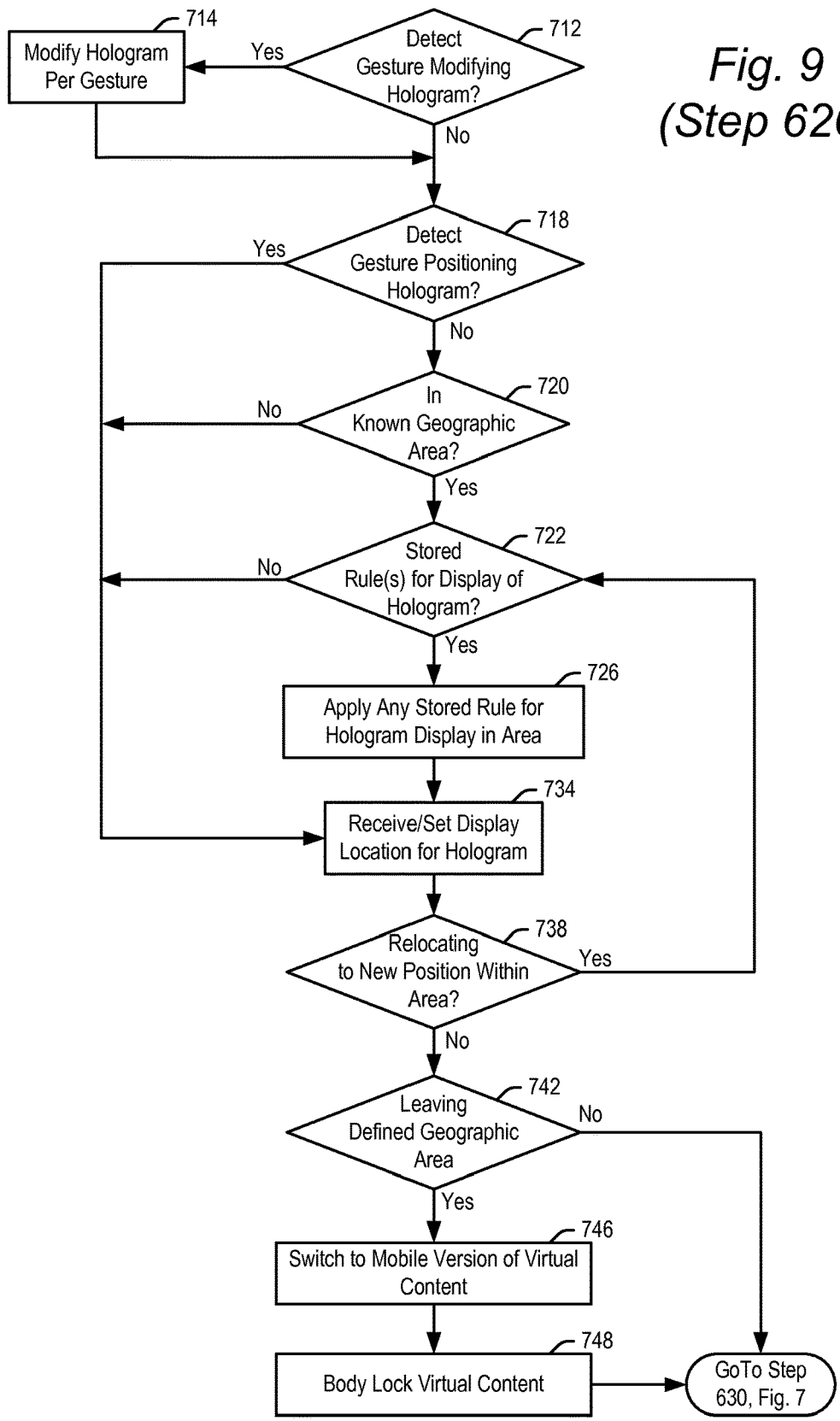
Figure 10:
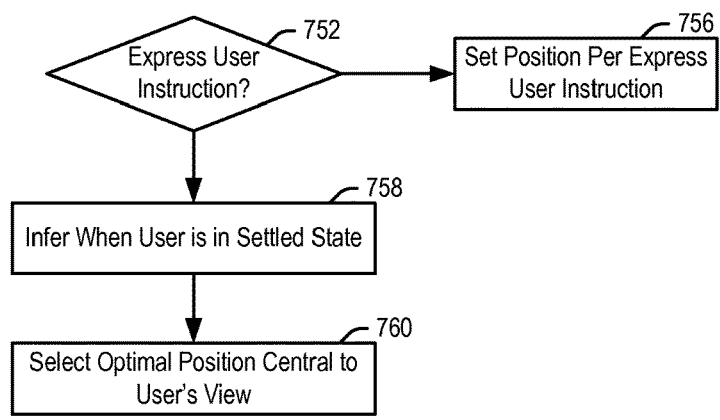

In step 612, the system may detect and track a user's skeleton and/or hands as described above, and update the scene map based on the positions of moving body parts and other moving objects. In step 614, the processing unit 4 determines the x, y and z position, the orientation and the FOV of the head mounted display device 2 within the scene. Further details of step 614 are now described with respect to the flowchart of FIG. 8.

In step 700, the image data for the scene is analyzed by the processing unit 4 to determine both the user head position and a face unit vector looking straight out from a user's face. The head position may be identified from feedback from the head mounted display device 2, and from this, the face unit vector may be constructed. The face unit vector may be used to define the user's head orientation and, in examples, may be considered the center of the FOV for the user. The face unit vector may also or alternatively be identified from the camera image data returned from the room-facing cameras 112 on head mounted display device 2. In particular, based on what the cameras 112 on head mounted display device 2 see, the processing unit 4 is able to determine the face unit vector representing a user's head orientation.

In step 704, the position and orientation of a user's head may also or alternatively be determined from analysis of the position and orientation of the user's head from an earlier time (either earlier in the frame or from a prior frame), and then using the inertial information from the IMU 132 to update the position and orientation of a user's head. Information from the IMU 132 may provide accurate kinematic data for a user's head, but the IMU typically does not provide absolute position information regarding a user's head. This absolute position information, also referred to as "ground truth," may be provided from the image data obtained from the cameras on the head mounted display device 2.

In embodiments, the position and orientation of a user's head may be determined by steps 700 and 704 acting in tandem. In further embodiments, one or the other of steps 700 and 704 may be used to determine head position and orientation of a user's head.

It may happen that a user is not looking straight ahead. Therefore, in addition to identifying user head position and orientation, the processing unit may further consider the position of the user's eyes in his head. This information may be provided by the eye tracking assembly 134 described above. The eye tracking assembly is able to identify a position of the user's eyes, which can be represented as an eye unit vector showing the left, right, up and/or down deviation from a position where the user's eyes are centered and looking straight ahead (i.e., the face unit vector). A face unit vector may be adjusted to the eye unit vector to define where the user is looking.

In step 710, the FOV of the user may next be determined. The range of view of a user of a head mounted display device 2 may be predefined based on the up, down, left and right peripheral vision of a hypothetical user. In order to ensure that the FOV calculated for a given user includes objects that a particular user may be able to see at the extents of the FOV, this hypothetical user may be taken as one having a maximum possible peripheral vision. Some predetermined extra FOV may be added to this to ensure that enough data is captured for a given user in embodiments.

The FOV for the user at a given instant may then be calculated by taking the range of view and centering it around the face unit vector, adjusted by any deviation of the eye unit vector. In addition to defining what a user is looking at in a given instant, this determination of a user's FOV is also useful for determining what may not be visible to the user. As explained below, limiting processing of virtual objects to those areas that are within a particular user's FOV may improve processing speed and reduces latency.

Aspects of the present technology relate to intelligently positioning and displaying virtual content in response to user movements, inferred intentions and interactions. Such intelligent positioning and displaying of virtual content may be provided by the contextual display engine 458 (FIG. 6) executing on processing unit 4, based on input received via the head mounted display device 2. Intelligent positioning and display of virtual content via the contextual display engine 458, processing unit 4 and display device 2 will now be explained in greater detail reference to FIGS. 9-15. While the following describes processing steps performed by the processing unit 4, it is understood that these steps may also or alternatively be performed by a processor within the head mounted display device 2 and/or some other computing device.

In step 622, the processing unit 4 may detect a contextual change. This change in context may come about in a variety of ways. In one embodiment, a change in context may be indicated to the processing unit 4 by express gestures performed by a user and perceived by the head mounted display device 2. In further embodiments, a change in context may be detected by sensors in the head mounted display device 2 independent of user gestures. Such contextual changes may include leaving or entering a geographic area, or moving around within a geographic area. Contextual changes may further be temporal, for example the processing unit 4 and/or head mounted device 2 detecting whether it is morning, noon or night, or whether it is a weekday or a weekend. Upon detecting a contextual change in step 622, the virtual content may be modified in step 626 based on the detected contextual change. Further details of steps 622 and 626 are now explained with reference to the flowchart of FIG. 9.

In step 712, the processing unit 4 may look for gestures intended to modify the virtual content. For example, the user may wish to stretch or otherwise resize the virtual content. Additionally, where the virtual content is a video, virtual controls may be displayed along with the video allowing a user to play or pause the video, and to skip forward or back through the video. Details regarding example virtual controls for this purpose are disclosed for example in U.S. Patent Publication No. 2013/0342572, entitled, "Control of Displayed Content in Virtual Environments." If such gestures are detected in step 712, the virtual content may be modified in step 714 in accordance with the performed gesture.

Figure 12:
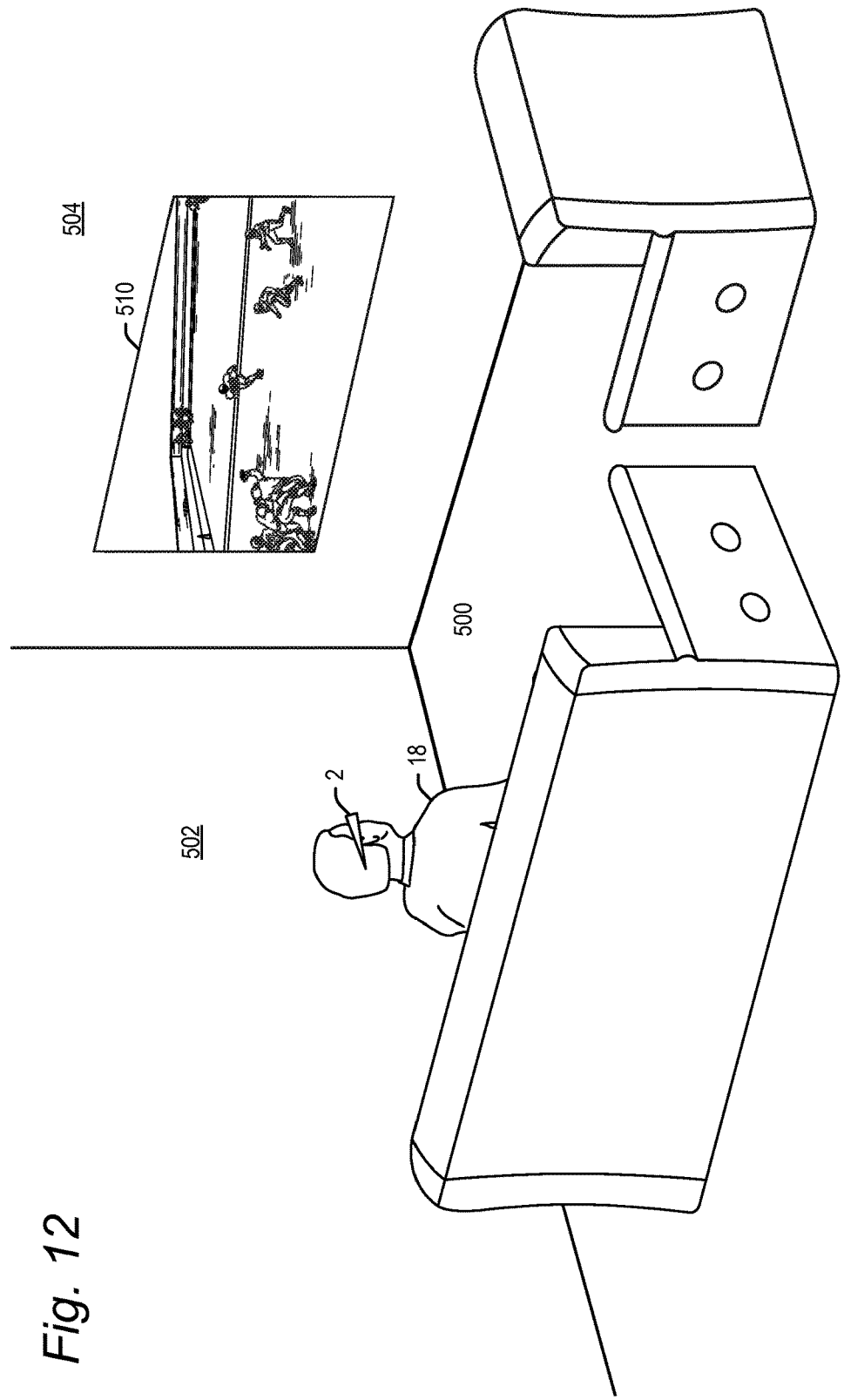

In step 718, the processing unit 4 may look for gestures intended to reposition the virtual content to a user-specified location in the geographic area. If such gestures are detected in step 718, the location of the virtual content may be set in step 734. As noted above, a user may position virtual content such as a video on blank space of a wall of a given geographic area. For example, FIG. 12 shows a user 18 in a geographic area 500, in this example a room including walls 502 and 504. The user 18 is viewing virtual content 510 (visible through the head mounted display device 2), which in this example is a video feed of a football game. The virtual content 510 has been positioned, or pinned, to the wall 504, either as a result of a gesture from the user 18, or based on a determination made by the processing unit 4 as described below.

Alternatively, it may happen that there is insufficient wall space convenient to the user, or the user wishes to display content at a position closer than an existing wall. The user may thus set up the display within the given geographic area to display the virtual content 510 on a virtual display slate 508, as shown for example in FIG. 13. The user may save this preference as a rule, as explained below.

Once positioned on wall 504 or slate 508, a user may perform a gesture to resize the virtual content 510 to a desired size, as described above with respect to steps 712 and 714. Alternatively, the processing unit 4 may automatically resize the content 510 to a size which is determined to be suitable, and in embodiments optimal. This resizing may be based on how far away the content 510 is from the user 18, and (if pinned to a wall) the available blank area on the wall. For example, the content may be displayed to fit the entire blank area on a wall. If there are pictures, windows or other objects on or in front of a wall, the processing unit may limit the size of the displayed content to fit the available space. Alternatively, where the amount of available blank space is not a constraint, or the content is on a display slate 508, the content may be displayed over a large area that still fits comfortably within the boundaries of the user's viewing frustum. This may be predefined using viewing frustum size data for a number of people, and what would be considered comfortable for a user to view all portions of the displayed content without having to move his or her head.

If no positioning gesture is detected in step 718, the processing unit 4 may next check in step 720 whether the user is in a known geographic area. In particular, as noted above with respect to steps 604 and 610 of FIG. 7, the head mounted display device 2 is able to receive data defining the user's environment. For example, if the user is within a room, the head mounted display device 2 is able to determine the positions of the walls and objects in the room and an overall geometry of the room. Where the user has been in this room or other geographic area before, the processing unit may store data defining the positions of walls, and possibly other objects within the room.

Thus, when a user enters the room or geographic area again, the processing unit 4 is able to determine that this is a known geographic area in step 720. In an example, the processing unit 4 is able to make this determination by taking the image data captured from a geographic area, and comparing this against image data for stored, known geographic areas. It is possible or likely that newly acquired image data for a room or other geographic area will not be captured from the same perspective as the stored image data of known geographic areas. Using matrix transformation equations, the processing unit 4 is able to translate and compare the current image data for a geographic area against stored image data for known geographic areas. As set forth above, methods are known for using matrix transformation equations to translate and compare image data between different perspectives from within a given geographic area.

If the processing unit 4 determines in step 720 that the user is not in a known geographic area, the processing unit 4 may automatically select and set default display parameters for the virtual content in step 734. These default display parameters may include an automatic determination by the processing unit 4 of where and how to display content when the user is at different locations within the geographic area. Further details of step 734 will now be explained with reference to the flowchart of FIG. 10.

As noted above, display position of virtual content may be set by express gesture (steps 752 and 756). Where no such express gesture is received, the processing unit 4 may infer when a user is in a settled state, as compared to a mobile state. The terms "settled state" and "mobile state" are explained below. But in general, a user 18 is considered to be in a settled state (step 758) when the processing unit 4 receives express gestures, or otherwise is able to draw inferences based on heuristics and cues, to determine that the user is settled in a position (sitting or standing) to view virtual content 510. A user 18 is considered to be in a mobile state when the processing unit 4 receives express gestures, or otherwise is able to draw inferences based on heuristics and cues, to determine that the user is mobile and on the move, for example walking from one geographic area to another, or within a geographic area.

Once the processing unit 4 is able to determine that the user 18 is in a settled state, the processing unit may then use that position to select a suitable, and in embodiments optimal, location central to the user's view to display the content (step 760). For step 760, the processing unit 4 may automatically select a position central to the user's view to display the virtual content. In examples, there may be a blank wall or space on a surface in front of the user. As noted above, the processing unit 4 determines a scene map including the position of walls and objects in the user's view. The processing unit 4 may thus select a blank wall space or other surface and pin the virtual display to the blank wall space other surface. As also noted above, the processing unit 4 may automatically resize the virtual content to an optimal size based on the available space and a distance between the virtual content and the user.

It may be that a user chooses to view virtual content when there is no open wall space in front of the user, or where user is moving as explained below. In such embodiments, in step 760, the processing unit may display a virtual display slate floating in space in front of the user, and display the virtual content on the virtual display slate, such as virtual display slate 508 in FIG. 13.

In the embodiment described above, the processing unit waited until a user was in position (step 758), and then selected where to display the content based on that position (step 760). In a further embodiment, upon a user first entering a new geographic area such as a room, the head mounted device 2 may scan the entire room, and make recommendations to the user as to where best to display the content. If the user accepts that recommendation, that position may thereafter be stored as a rule for that geographic area.

On the other hand, if the processing unit 4 determines in step 720 that the user is in a known geographic area, the processing unit 4 may then perform a step 722 of checking whether one or more stored rules exist relating to the display of virtual content in that known geographic area. These stored rules may be user-defined, based on user preferences. The stored rules may include any user preference relating to what content a user wishes to view in a given geographic area and/or how and where that content is to be presented.

For example, when sitting in a particular location within the geographic area (such as for example on the couch shown in FIG. 12), a user may position and size virtual content as desired, for example on facing wall 504. The user may thereafter perform some predefined gesture to form and store a rule that, when on the couch in this geographic area, display content on facing wall 504, at the current size. Thereafter, when a user is again in that position in that same geographic area, the processing unit 4 identifies that a stored rule exists for that geographic area in step 722. Once identified, the rule may be applied in step 726 to automatically display the virtual content in accordance with the user-defined preferences expressed in the rule. As explained below, different rules may be created for different locations within a geographic area.

More than one rule may be created for a single geographic area. As explained below with respect to FIG. 14, a user may move around within a room or other geographic area, and the user may store rules covering different content-viewing preferences for different locations within a geographic area.

On the other hand, where no stored rule for a known geographic area is identified in step 722, the processing unit 4 may instead set default display parameters for the virtual content in step 734 as explained above.

In accordance with aspects of the present technology, the processing unit 4 provides intelligent display of virtual content, depending on whether the processing unit 4 determines that the user is in a settled state or a mobile state. The processing unit 4 may determine that a user is in a settled state when the user is generally stationary. That is, the user may be moving his or her arms, legs, head, etc., but is either seated or standing generally in one location. The processing unit may determine that a user is in a mobile state where the user is not generally in one location, but is instead walking to another location. During the course of viewing virtual content, the processing unit 4 may determine that the user transitions from a settled state to a mobile state. The processing unit may infer this in a variety of ways, as explained below. A user may be in a mobile state moving around within a geographic area. A user may also be in a mobile state and leave a geographic area. In embodiments, the processing unit may handle these situations differently.

For example, when in a mobile state but moving within a geographic area, the virtual content may stay in its current position (in the absence of an express gesture to move it). Thus, in FIG. 12, if the user 18 gets off the couch and moves around within room 500, the virtual content 510 may stay pinned to its position on the wall 504.

It may happen that a user relocates to a new position within a geographic area (step 738). For example, in FIG. 14, a user has moved to another location within the same room. In step 738, using the sensors in the head mounted display device 2, movement of the user may be detected. Once the processing unit 4 determines that the user is again in a settled state, the processing unit 4 may again perform step 722 of checking whether any stored rules apply to the display of virtual content from the new location within the geographic area.

If a stored rule sets forth where and/or how to display the virtual content when the user is in the new location, that rule is applied in step 726 to define where and/or how the virtual content is displayed. On the other hand, if no stored rule applies to the new position within the geographic area, the processing unit 4 may set the display location in step 734 as explained above. For example, the processing unit 4 may select an open wall in the general direction in which the user is facing, and pin the virtual content to that wall.

Figure 14:
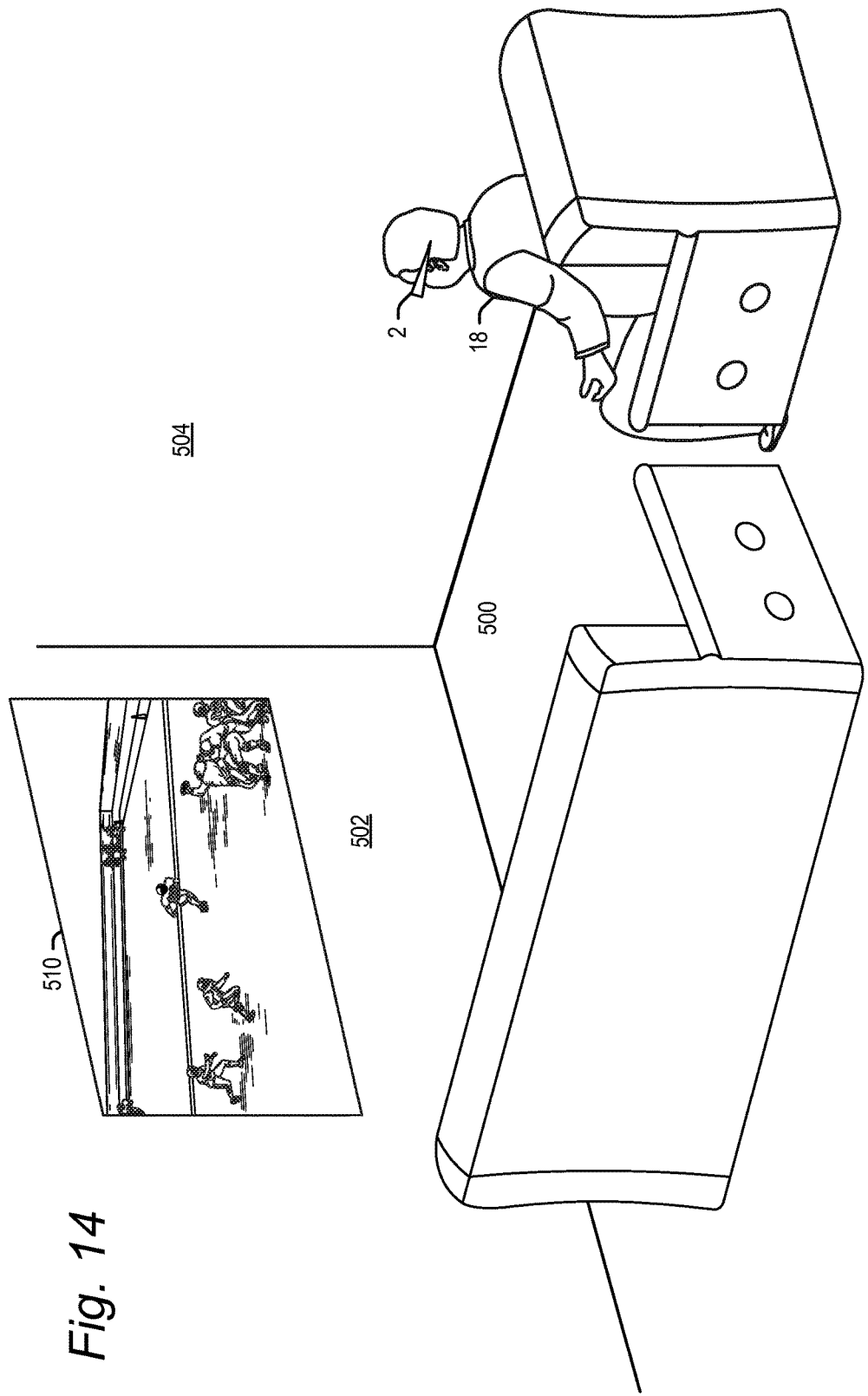

Thus, in FIG. 14, the user has moved to a new location within the geographic area (room 500) relative to that shown in FIG. 12. As a result of a stored rule applying to that location, or as a result of the processing unit 4 determining where and how to display the virtual content in the absence of a rule, the virtual content 510 moves from wall 504 to wall 502. It may happen that a user relocates to a new position within a given geographic area, but the content stays where it was (for example, it stays on wall 504 in FIG. 14). This may happen as a result of a rule covering the new position or as a result of the processing unit 4 determining that the wall 504 is still the best location for a user to view the content 510 from the new position.

Figure 13:
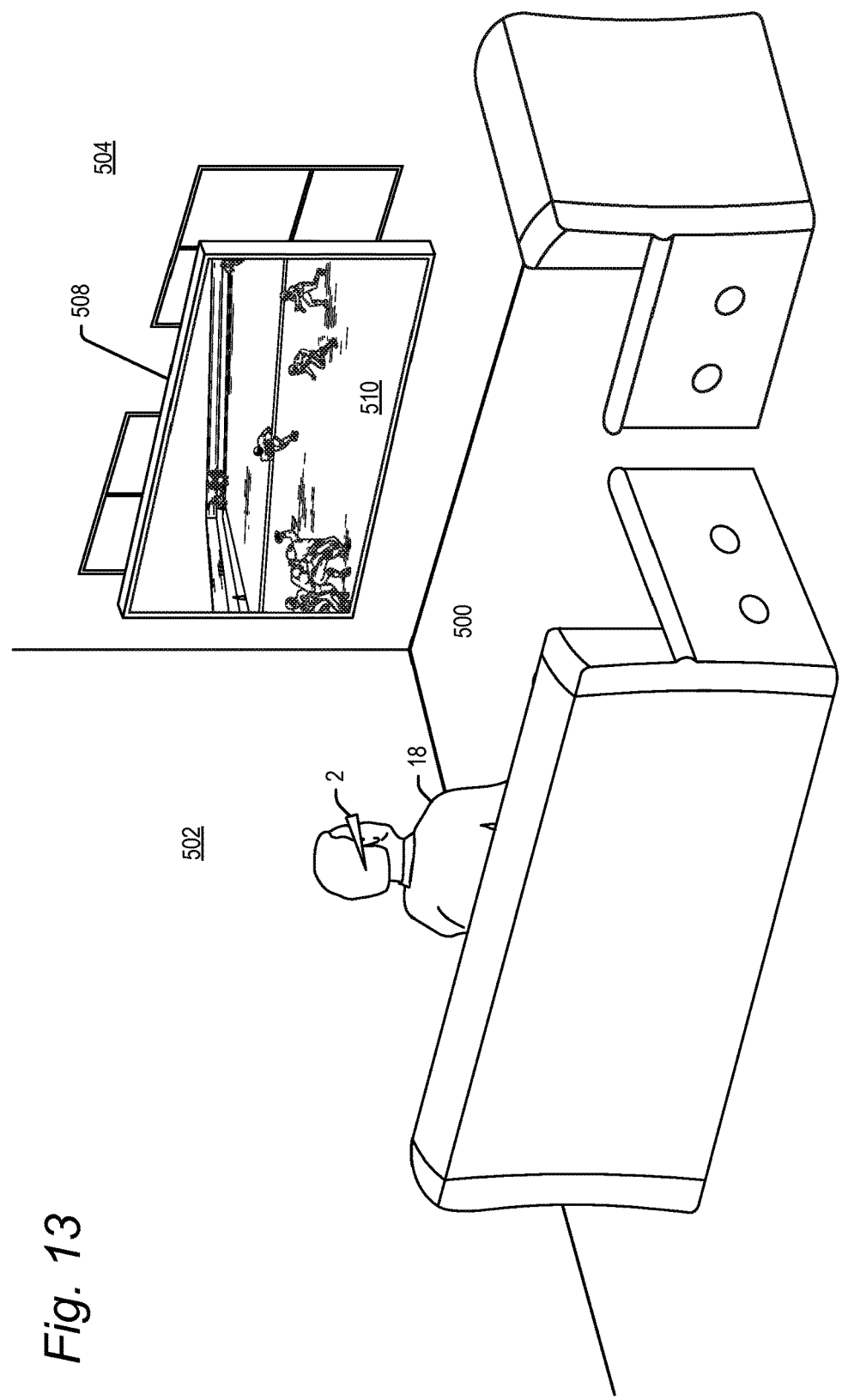

FIGS. 12-14 illustrate situations where the content is displayed generally vertically to a user, for a user to view while standing or sitting. However, it is understood that content may be displayed in any orientation to a user. For example, where a user is lying down, content may be displayed horizontally, for example on the ceiling or on a horizontal display slate.

Instead of relocating to a new position within a geographic area, a user may choose to leave a geographic area altogether. The head mounted display device 2 knows the boundaries of a geographic area and can sense when a user is leaving those boundaries. In this event, the content may switch from a full view to a mobile version of the content as explained below. For the purposes of the present technology, where a geographic area does not have clearly defined boundaries, arbitrary boundaries may be selected by the processing unit 4, and the content may switch from full view to the mobile version once the user leaves the arbitrary boundaries of a geographic area.

In the mobile version of the virtual content, the content may hop from the wall or its previous position, and travel with the user. When travelling with the user in mobile version, the virtual content be positioned in a way so as not to interfere with the user's movement or attention. Thus, in step 742, the processing unit 4 detects whether a user is leaving a geographic area. If not, the flow may return to step 630 in FIG. 7. On the other hand, if the head mounted display device 2 and processing unit 4 detect that a user is leaving a geographic area in step 742, the processing unit 4 may switch to a mobile version of the virtual content in step 746, and body lock the virtual content in step 748.

Figure 15:
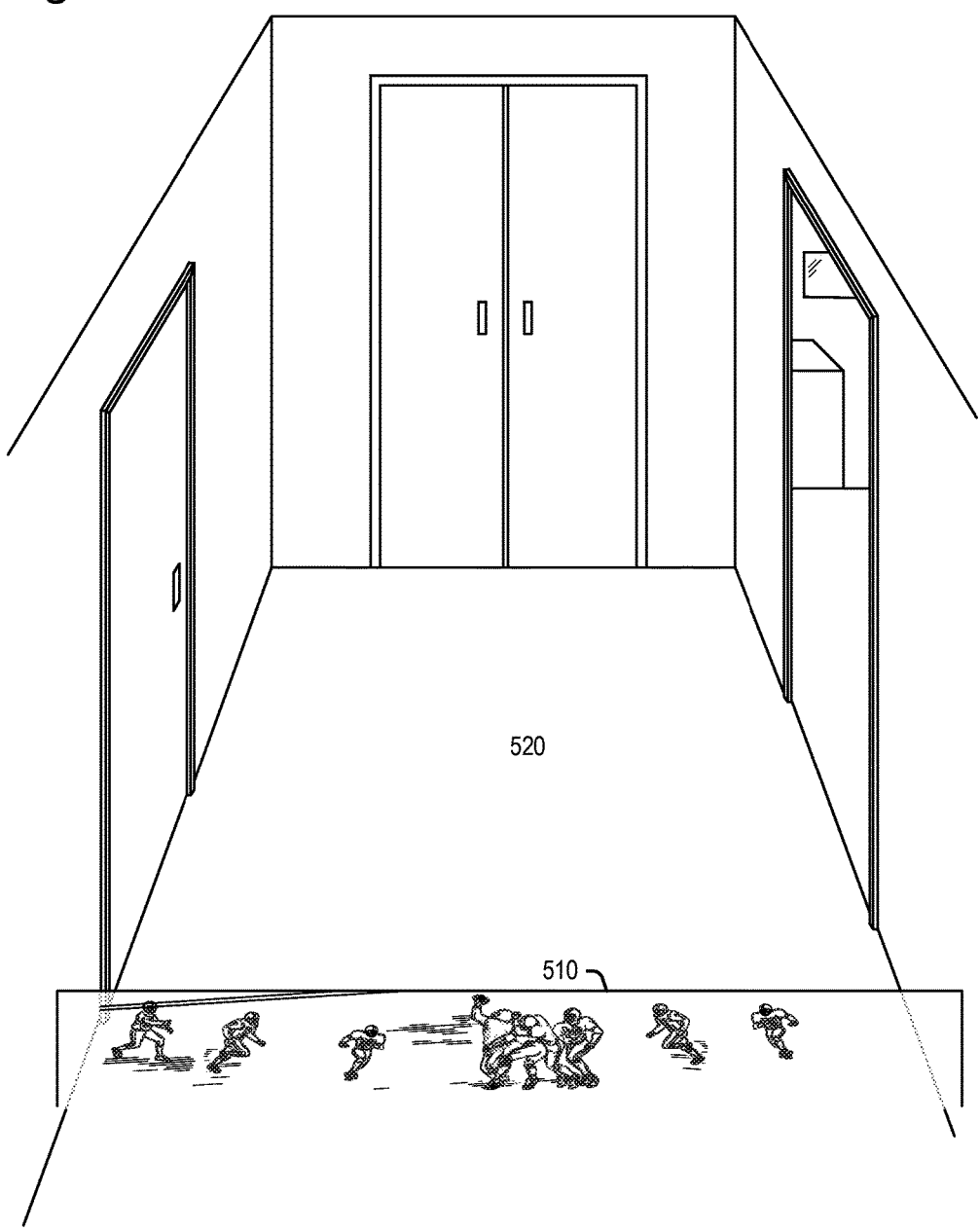

The mobile version of the virtual content may show only a portion of the virtual content and may be positioned on a display slate in the peripheral view of the user. For example, FIG. 15 illustrates the user having left the room 500 and is now walking down a hallway 520 (FIG. 15 is a view through the head mounted display device 2). As shown, the virtual content 510 may be reduced to show only a portion of the content, and may be positioned in the periphery of a user's view, such as for example toward the bottom of a user's view. The amount of the virtual content 510 shown in the mobile version of the content may be more or less than that shown in FIG. 15. And the position of the virtual content 510 shown in the mobile version may be to the side, above, or at some other peripheral position within the user's view.

When displaying the mobile version of the content, the virtual content may be displayed with a degree of transparency, so that real world objects behind the content are not completely obscured by the content. In such embodiments, the virtual content may be made less opaque (decrease alpha value) or otherwise visually muted.

The content 510 is world locked when the user is viewing content in a settled state, but the content 510 is body locked in the mobile version of the content so as to move with the user. The content may remain body locked in the periphery of the user's view so as not to obstruct the user's view as he or she moves around. However, at any time, the user may move his or her head to look at the mobile version of the virtual content 510. Upon the processing unit 4 detecting a user looking in the direction of the virtual content for some predetermined period of time, the processing unit 4 may exit the mobile version of the content. Thus, even though the user may still be in a mobile state, the processing unit 4 may display the full virtual content on a body locked virtual display slate at a position central or peripheral to the user's view as explained above.

Figure 16:
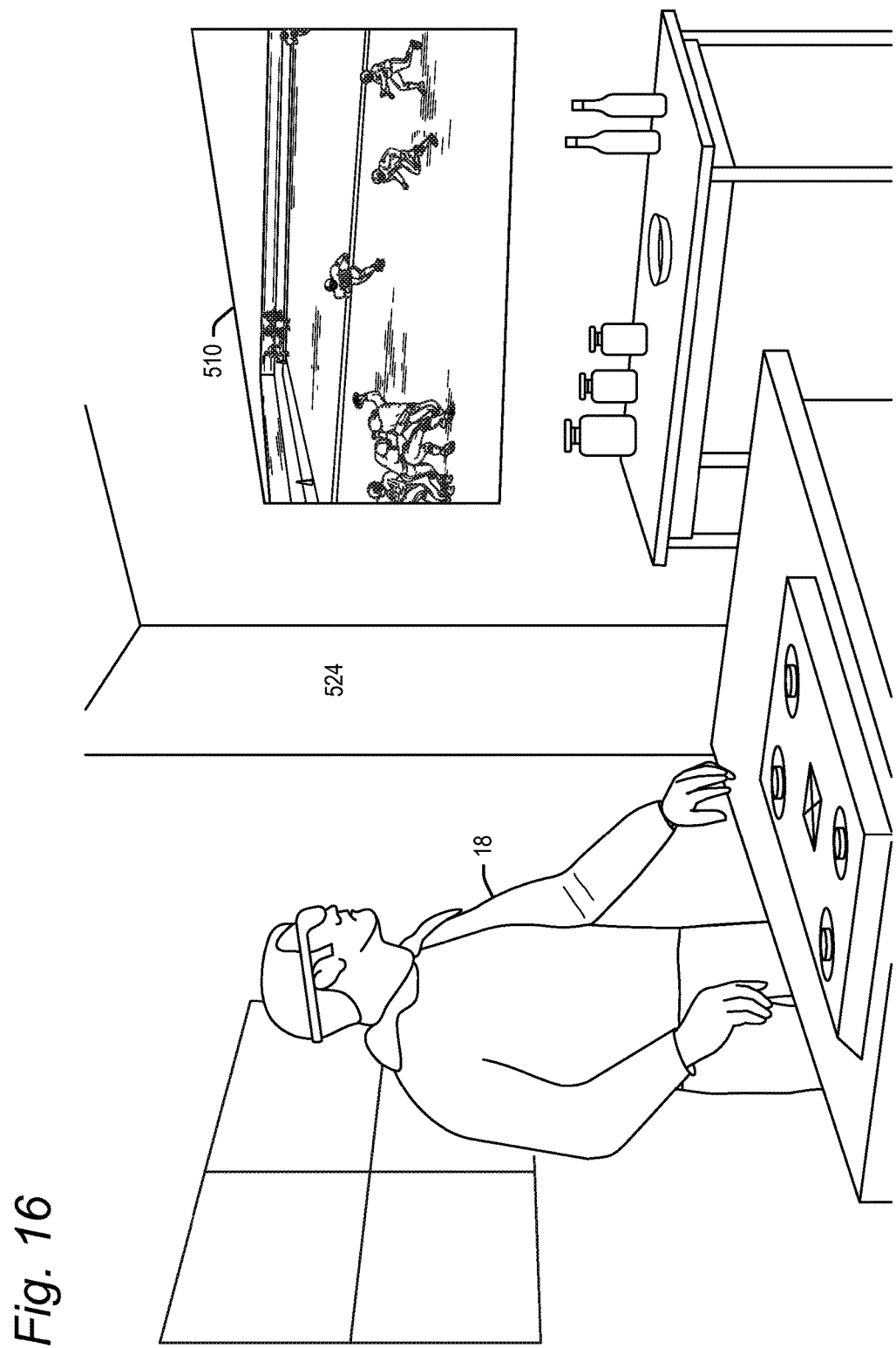

At some point, the user may return to the original geographic location, or enter a new geographic location, and settle into a new position from which to view virtual content, such as a new room 524 shown in FIG. 16. At that point, the processing unit 4 may switch from a mobile state to a settled state. The processing unit 4 may then again run through the steps of FIG. 9 to display the virtual content on an available wall or virtual display slate. The content may be displayed per any applicable rules for the new geographic area, or, in the absence of any applicable rule, the processing unit 4 may determine how optimally to display the content to the user. Thus, a user may enjoy content in one geographic area, store the content as a mobile version when on the go, and then re-display the content in a new geographic area without interrupting the displayed content and without impeding the user as he or she moves around.

Instead of waiting until the user is settled and in the settled state, the processing unit 4 may recognize when a user first enters a geographic location, and at that point display content per applicable rules or at a determined optimized location. The user may thereafter walk to a desired location from which to view the content.

In embodiments described above, the processing unit may be in a mobile state, but the content may stay in its original fully display position while the user is moving around within a geographic area. In further embodiments, the processing unit may switch the content to a mobile version of the content as soon as the user starts moving around within the same geographic area. That is, when the processing unit 4 determines the user has moved from a settled state to a mobile state, the content is switched to the mobile version, even though the user is moving around within the same geographic area.

In embodiments described above, the content switches to a mobile version, for example when the user moves to a new geographic area. In further embodiments, instead of a mobile version of the content, the content may stop when a user leaves one geographic area, and then reappear once the user reaches a settled state in a new geographic area at the point where the content left off. In further embodiments, a user may wish content to stay locked in a given position in a given geographic area, even where the user leaves that geographic area. This may be carried out by the processing unit 4 in accordance with a received gesture from the user, such as a verbal gesture to "lock content there." The content may either continue, or pause when the user leaves.

The present technology provides for intelligent display and mobile viewing of virtual content. Present technology also relates to intelligent schemes for determining when to move displayed content upon movement of a user. In embodiments, a scheme is disclosed which provides steady display of content, while at the same time being responsive when the user moves. As described above, when a user switches from a settled state to a mobile state, the displayed content may remain in position while a user moves around within a given geographic area. If the user again switches from a mobile state to a settled state within the geographic area, the displayed image may stay where it was or move to a new position within the geographic area. Alternatively, if the user leaves the geographic area the displayed image may then change to a mobile version of the content to travel with the user. If the user again switches from a mobile state to a settled state within a new geographic area (or returns to the original geographic area) the displayed image may switch from the mobile version to a fully displayed version of the content at a user-selected or processing unit-selected position.

It is understood that the present system may be configured differently to alter the position of displayed content upon user movement. For example, in embodiments, the system can be made more sensitive to user movement, such that displayed content may move from one position to another, or from a full view to a mobile version, upon slight movements of the user.

Given the wide range of possible user movements and positions, there may not be a single, definable set of user actions which indicate a switch from a mobile state to a settled state, or vice versa. However, the processing unit 4 is able to determine these switches in state by interpretation of express gestures, and drawn inferences based on heuristics and body position and movement cues.

For example, as described above, a user has the option of controlling precisely where to display content, and whether to display it in full or mobile version, by express gestures. Where a user has settled into a position to watch content, the user may for example say, "play content" (or "play movie," "start game," etc.). Where a user wishes to move to a new geographic area, or within a given geographic area, the user can say "go mobile" (or "let's go," etc.), and the content may move or switch to the mobile version.

In the absence of express gestures, the processing unit 4 can draw inferences based on user movements and/or context. The head mounted display device 2 has sensors which allow the processing unit 4 to determine when a user moves from a standing to a sitting position (or vice versa), or when a user stops or starts walking. The head mounted display device 2 also has sensors which allow the processing unit 4 to determine when a user is gazing at a particular location for some predetermined length of time. Each of these actions may be used by the processing unit 4 to determine when a user is in a settled state or a mobile state.

Additionally, heuristic algorithms may be applied in conjunction with the skeletal tracking module 448 and the sensors in the head mounted display device 2 to understand when a user is mobile or is settled into a location where they are ready to receive virtual content. For example, the skeletal tracking module 448, and the sensors within the head mounted display device 2, may identify when a user is relatively still, and the processing unit may infer that the user has moved into a settled state where he or she is ready to receive content. The user may set preferences, or the processing unit 4 may optimize settings, to achieve a balance between moving the content too often and moving the content too slowly.

In order to prevent rapid jumping of the content back and forth (for example where a user hovers at the border of a geographic location), various known smoothing algorithms may be applied by the processing unit 4 in analyzing user movement. These smoothing algorithms may for example build a small delay in moving the displayed content, until the user action can be clearly determined by the processing unit 4.

In further embodiments, the processing unit 4 may prompt a user before starting or changing content, changing a position of content, or switching between a full version and a mobile version of the content.

In additional to where and how to display content in a given geographic area, rules may be created by a user and stored relating to the type content that is to be displayed in a given geographic area. For example, referring to FIG. 17, when a user 18 is in the kitchen, the content 510 displayed to the user may be cooking shows. If the user is already viewing content (for example a mobile version of content) when the user enters the kitchen or other geographic area having applicable content rules, the processing unit 4 may prompt the user 18 as to whether they would like to continue viewing the content they are watching, or switch to the content specified in the content rule. A content rule for cooking shows in the kitchen is one of any number of content rules which can be set up for geographic areas in a user's home, workplace, frequented establishments, etc.

In addition to geographic area-based content rules, rules may be set up expressing a preference to view certain content at certain times of day or the week, e.g., current event news in the morning and movies at night. Content rules may also be set up based on which users are together viewing content. When a user is watching content with his or her children, a rule may specify that children's content is displayed. It is understood that any of a wide variety of contextual rules may be set up and stored based on user preferences for how and where content is displayed, as well as what that content is.

Figure 11:
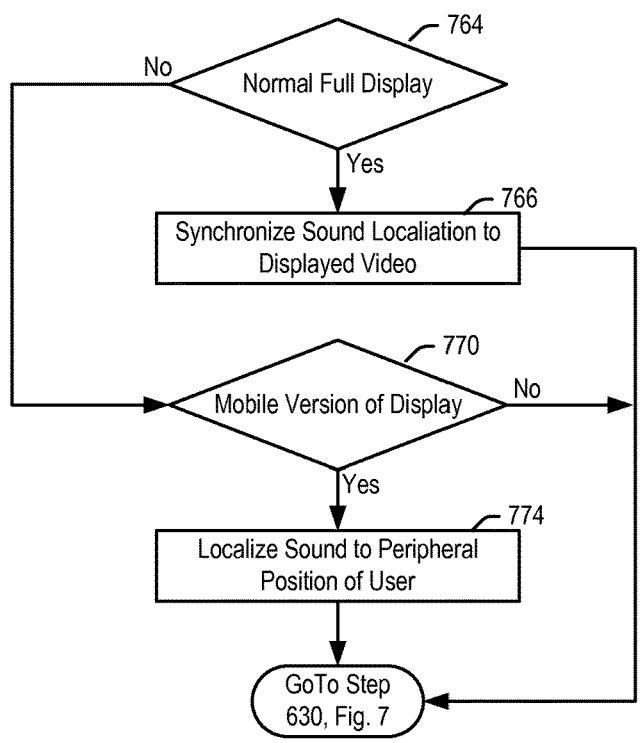

In accordance with further aspects of the present technology, the head mounted display device 2 in conjunction with the processing unit 4 may provide stereophonic and localized audio to accompany displayed video. Referring now to FIG. 11, in step 764 the processing unit 4 may determine whether a full version of the content is being displayed. If so, the processing unit 4 may synchronize the location of the stereophonic sound to the location of the displayed video in step 766.

Alternatively, if the processing unit 4 determines that a mobile version of the content is being displayed in step 770, the processing unit can localize the sound to a peripheral position of the user in step 774 where the mobile version is being displayed. A user may define rules as described above relating to audio playback accompanying the video. For example, a user to have a rule to mute or lower the volume of content when in a particular geographic area, or while a mobile version of the content is being displayed.

Referring again to FIG. 7, in addition to or instead of modifying content based on contextual changes, the present technology may modify content based on detecting the presence of another person while viewing content. In particular, in step 630, the processing unit 4 may detect the presence of another person in a geographic area while a user is viewing content. Upon such detection, the processing unit may modify the virtual content in step 632. Further details of steps 630 and 632 are provided for example in U.S. patent application Ser. No. 14/598,578, entitled "Conversation, Presence and Context Detection For Hologram Suppression," filed Jan. 16, 2015. However, in general, where a person enters a geographic area where a user is viewing content (step 630), the processing unit may determine whether the user wishes to suppress content to carry on a conversation with the person that entered. If so, the content may be suppressed (step 632). Content may be suppressed in any of a variety of manners, including for example pausing the content, stopping the content and/or modifying the content so that it does not obscure the person. Audio may also be muted or turned down.

Referring again to FIG. 7, once the processing unit determines how and where to display content, and what content to display, rendering operations may begin. In step 634, the processing unit 4 may cull the rendering operations so that just those virtual objects which could possibly appear within the final FOV of the head mounted display device 2 are rendered. The positions of other virtual objects may still be tracked, but they are not rendered. It is also conceivable that, in further embodiments, step 634 may be skipped altogether and the entire image is rendered.

The processing unit 4 may next perform a rendering setup step 638 where setup rendering operations are performed using the scene map and FOV received in steps 610 and 614. Once virtual object data is received, the processing unit may perform rendering setup operations in step 638 for the virtual objects which are to be rendered in the FOV. The setup rendering operations in step 638 may include common rendering tasks associated with the virtual object(s) to be displayed in the final FOV. These rendering tasks may include for example, shadow map generation, lighting, and animation. In embodiments, the rendering setup step 638 may further include a compilation of likely draw information such as vertex buffers, textures and states for virtual objects to be displayed in the predicted final FOV.

Using the information regarding the locations of objects in the 3-D scene map, the processing unit 4 may next determine occlusions and shading in the user's FOV in step 644. In particular, the scene map has x, y and z positions of objects in the scene, including any moving and non-moving virtual or real objects. Knowing the location of a user and their line of sight to objects in the FOV, the processing unit 4 may then determine whether a virtual object partially or fully occludes the user's view of a real world object. Additionally, the processing unit 4 may determine whether a real world object partially or fully occludes the user's view of a virtual object.

In step 646, the GPU 322 of processing unit 4 may next render an image to be displayed to the user. Portions of the rendering operations may have already been performed in the rendering setup step 638 and periodically updated. Any occluded virtual objects may not be rendered, or they may be rendered. Where rendered, occluded objects will be omitted from display by the opacity filter 114 as explained above.

In step 650, the processing unit 4 checks whether it is time to send a rendered image to the head mounted display device 2, or whether there is still time for further refinement of the image using more recent position feedback data from the head mounted display device 2. In a system using a 60 Hertz frame refresh rate, a single frame is about 16 ms.

If time to display an updated image, the images for the one or more virtual objects are sent to microdisplay 120 to be displayed at the appropriate pixels, accounting for perspective and occlusions. At this time, the control data for the opacity filter is also transmitted from processing unit 4 to head mounted display device 2 to control opacity filter 114. The head mounted display would then display the image to the user in step 658.

On the other hand, where it is not yet time to send a frame of image data to be displayed in step 650, the processing unit may loop back for more recent sensor data to refine the predictions of the final FOV and the final positions of objects in the FOV. In particular, if there is still time in step 650, the processing unit 4 may return to step 604 to get more recent sensor data from the head mounted display device 2.

The processing steps 600 through 658 are described above by way of example only. It is understood that one or more of these steps may be omitted in further embodiments, the steps may be performed in differing order, or additional steps may be added.

In summary, an example of the present technology relates to a system for presenting a virtual environment comprising: a head mounted display device including a display unit for displaying three-dimensional virtual objects in the virtual environment; and a processing unit operatively coupled to the display device, the processing unit determining a geographic area in which the head mounted display device is located based on feedback from the head mounted display device, the processing unit directing the display unit to display a virtual object based on the determined geographic area.

Another example of the present technology relates to a system for presenting a virtual environment comprising: a head mounted display device including a display unit for displaying three-dimensional virtual objects in the virtual environment; and a processing unit operatively coupled to the display device, the processing unit directing the display unit to display one of a full, world-locked version of virtual content and a mobile, body locked version of the content, depending at least in part on whether the processing unit determines that the user is in a settled state or is in a mobile state.

In a further example, the present technology relates to a method of presenting a virtual environment via a head mounted display device and a processing unit associated with the head mounted display device, the method comprising: (a) detecting whether the head mounted display device is in a geographic location or walking out of the first geographic location; (b) displaying virtual content in a determined world-locked position upon detecting that the head mounted display device is in the geographic location; and (c) displaying a mobile version of the virtual content in a body-locked position upon detecting that the head mounted display device is leaving the geographic location.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A system for presenting a virtual environment, comprising:
    a head mounted display device including a display for displaying three-dimensional virtual objects in the virtual environment; and
    a processor operatively coupled to the display device, the processor configured to:
        determine a geographic area in which the head mounted display device is located based on feedback from the head mounted display device, the geographic area comprising an area bounded by at least first and second walls;
        determine whether the geographic area is a known geographic area by comparing image data of the feedback from the head mounted display device to stored image data for known geographic areas;
        in response to a determination that the geographic area is a known geographic area, determine a rule specific to the geographic area and stored in a memory of the head mounted display, wherein the rule was stored during a previous visit to the geographic area and in response to receiving a user preference input indicating a user preference for a size at which a virtual object is to be displayed within the geographic area;
        direct the display to display a virtual object at the first wall where the head mounted display device is facing the first wall, and to direct the display to display the virtual object at the second wall where the head mounted display device is facing the second wall; and
        direct the display to display the virtual object at a position within the geographic area with a size that is determined based on the stored rule in response to determining that there is a stored rule.

2. The system of claim 1, wherein the position is determined based on another stored rule indicating another user preference with respect to positioning the displayed virtual object in the geographic area.

3. The system of claim 1, wherein the position is determined based on a scanning of the geographic area by sensors in the head mounted display device to determine a suitable position at which the virtual object is to appear to be displayed.

4. The system of claim 1, wherein the position is determined based on a gesture performed by a user and detected by the head mounted display device, the gesture indicating the position.

5. The system of claim 1, wherein in response to the processor determining that the geographic area is not a known geographic area, the size is determined based on a scanning of the geographic area by sensors in the head mounted display device to determine a suitable size for display of the virtual object at the position at which the virtual object is to appear to be displayed, and the given size is stored as a new stored rule for the new geographic area.

6. The system of claim 1, wherein where the processor determines that the first wall has an open space, based on feedback from the head mounted display device, the processor is configured to direct the head mounted display device to display the virtual object so as to appear to be displayed on the open space of the first wall.

7. The system of claim 1, wherein the virtual object is virtual content including at least one of static images and dynamic content.

8. The system of claim 1, wherein the virtual object is virtual content including at least one of web pages and user interfaces for software applications.

9. A system for presenting a virtual environment comprising:
    a head mounted display device including a display for displaying three-dimensional virtual objects in the virtual environment; and
    a processor operatively coupled to the display device, the processor configured to;
        determine whether the head mounted display is in a settled state within a geographic area comprising an area bounded by at least first and second walls or a mobile state moving out of the geographic area and not when the user is walking around within the geographic area based on feedback from the head mounted display device;
        direct the display to display one of a full, world-locked version of virtual content in response to determining that the head mounted display device is in a settled state and a mobile, body-locked version of the content where the virtual content is displayed in a periphery of a user's view, in response to determining that the head mounted display device is in a mobile state.

10. The system of claim 9, wherein the processor is configured to direct the display to display the virtual content with a degree of translucence in the mobile version.

11. The system of claim 9, wherein the processor is configured to automatically switch between the full version of the content and the mobile version of the content based on whether the processor detects the user going from the mobile state to the settled state, and vice versa.

12. A method of presenting a virtual environment via a head mounted display device and a processor associated with the head mounted display device, the method comprising:
   (a) detecting whether the head mounted display device is in a settled state within a geographic area comprising an area bounded by at least first and second walls, or a mobile state walking out of the geographic area;
   (b) displaying virtual content in a determined world-locked position upon detecting that the head mounted display device is in the settled state in the geographic area; and
   (c) switching to displaying a mobile version of the virtual content in a body-locked position based upon detecting that the head mounted display device is in a mobile state leaving the geographic area.

13. The method of claim 12, said step (b) comprising the step of displaying the virtual content in a position determined based on input received from a user.

14. The method of claim 12, said step (b) comprising the step of displaying the virtual content in a position determined by the processing device based on a determined layout of the geographic area and available space for displaying the virtual content.

15. The method of claim 12, said step (b) comprising the step of displaying the virtual content in one of a plurality of positions in the geographic location, based on a location and orientation of the head mounted display device in the geographic location.

16. The method of claim 1, wherein the stored rule is specific to the geographic area such that the stored rule is only applicable when the user of the head-mounted display device is within the geographic area bounded by the first and second walls.

* * * * *